(12) United States Patent
Farmanbar et al.

(10) Patent No.: US 11,973,714 B2
(45) Date of Patent: *Apr. 30, 2024

(54) SPARSE REFERENCE SIGNAL-RELATED SIGNALING APPARATUS AND METHODS

(71) Applicants: Hamidreza Farmanbar, Ottawa (CA); Jianglei Ma, Ottawa (CA); Yicheng Lin, Ottawa (CA); Navid Tadayon, Kanata (CA)

(72) Inventors: Hamidreza Farmanbar, Ottawa (CA); Jianglei Ma, Ottawa (CA); Yicheng Lin, Ottawa (CA); Navid Tadayon, Kanata (CA)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 32 days.

This patent is subject to a terminal disclaimer.

(21) Appl. No.: 17/589,128

(22) Filed: Jan. 31, 2022

(65) Prior Publication Data

US 2022/0158795 A1 May 19, 2022

Related U.S. Application Data

(63) Continuation of application No. 16/556,805, filed on Aug. 30, 2019, now Pat. No. 11,258,565.

(51) Int. Cl.
*H04L 5/00* (2006.01)
*H04B 7/0404* (2017.01)
*H04B 7/06* (2006.01)

(52) U.S. Cl.
CPC ......... *H04L 5/0051* (2013.01); *H04B 7/0404* (2013.01); *H04B 7/0626* (2013.01); *H04L 5/0053* (2013.01)

(58) Field of Classification Search
None
See application file for complete search history.

(56) References Cited

U.S. PATENT DOCUMENTS 9,460,401 B2 10/2016 Zeng et al.
10,142,070 B1 11/2018 Zhou et al.
(Continued)

FOREIGN PATENT DOCUMENTS

CN 102594516 A 7/2012
CN 103220066 A 7/2013
(Continued)

OTHER PUBLICATIONS

3GPP TS 36.211 V13.11.0 (Jun. 2019), 3rd Generation Partnership Project; Technical Specification Group Radio Access Network; Evolved Universal Terrestrial Radio Access (E-UTRA); Physical channels and modulation (Release 13), total 176 pages.
(Continued)

*Primary Examiner* — Walter J Divito

(57) ABSTRACT

Sparse reference signal-related signaling, for a wireless channel that is associated with multiple antenna ports, is communicated with a User Equipment (UE). The sparse reference signal-related signaling is consistent with a sparse signaling pattern. In an embodiment, the sparse signaling pattern includes reference signal-related signaling associated with each of the antenna ports, and has been determined based on previous reference signal-related signaling previously communicated with the UE or another UE. In another embodiment, the sparse reference signal-related signaling is consistent with a varying sparse signaling pattern that is based on previous reference signal-related signaling previously communicated with the UE or another UE.

32 Claims, 13 Drawing Sheets

(56) References Cited

U.S. PATENT DOCUMENTS

| | | |
|---|---|---|
| 2006/0146948 A1 | 7/2006 | Park et al. |
| 2009/0175370 A1 | 7/2009 | Kuroda et al. |
| 2012/0076101 A1 | 3/2012 | Kojima |
| 2014/0247748 A1 | 9/2014 | Kang et al. |
| 2015/0282123 A1 | 10/2015 | Miao et al. |
| 2015/0282124 A1 | 10/2015 | Miao et al. |
| 2015/0312008 A1 | 10/2015 | Annavajjala |
| 2015/0319757 A1 | 11/2015 | Baldemair et al. |
| 2015/0351063 A1 | 12/2015 | Charbit et al. |
| 2016/0066209 A1 | 3/2016 | Lin |
| 2016/0105264 A1 | 4/2016 | Chen et al. |
| 2016/0211959 A1 | 7/2016 | Ngren et al. |
| 2016/0249350 A1 | 8/2016 | Koutsimanis et al. |
| 2016/0359600 A1 | 12/2016 | Krzymien et al. |
| 2017/0279579 A1 | 9/2017 | Qian et al. |
| 2017/0338923 A1 | 11/2017 | Prasad et al. |
| 2018/0054288 A1 | 2/2018 | Gelabert et al. |
| 2018/0219662 A1 | 8/2018 | Kim et al. |
| 2018/0254868 A1 | 9/2018 | Saito et al. |
| 2018/0331872 A1 | 11/2018 | Manolakos et al. |
| 2019/0123864 A1 | 4/2019 | Zhang et al. |
| 2019/0305908 A1 | 10/2019 | Lee et al. |
| 2019/0334749 A1 | 10/2019 | Tang |
| 2019/0357221 A1 | 11/2019 | Davydov et al. |
| 2020/0044796 A1 | 2/2020 | Yang et al. |
| 2020/0343985 A1 | 10/2020 | O'Shea et al. |

FOREIGN PATENT DOCUMENTS

| | | |
|---|---|---|
| CN | 104980247 A | 10/2015 |
| CN | 106716865 A | 5/2017 |
| CN | 107979455 A | 5/2018 |
| CN | 109075851 A | 12/2018 |
| CN | 109167618 A | 1/2019 |
| CN | 109417782 A | 3/2019 |
| CN | 109672464 A | 4/2019 |
| CN | 109743269 A | 5/2019 |
| CN | 110603740 A | 12/2019 |
| WO | 2017018969 A1 | 2/2017 |
| WO | 2017107084 A1 | 6/2017 |
| WO | 2018053009 A1 | 3/2018 |
| WO | 2018063042 A1 | 4/2018 |
| WO | 2018127208 A1 | 7/2018 |

OTHER PUBLICATIONS

Huawei et al., "Discussion on the design of SCMA", 3GPP TSG RAN WG1 Meeting #92bis, R1-1803663, Sanya, China, Apr. 16-20, 2018, total 7 pages.

ZTE, "Discussion on some issues of additional carrier types", 3GPP TSG-RAN WG1 Meeting #67, R1-113754, San Francisco, USA, Nov. 14-18, 2011, total 4 pages.

Peihao Dong, et al., "Machine Learning Prediction based CSI Acquisition for FDD Massive MIMO Downlink," IEEE GLOBECOM, Dec. 2018, 6 pages.

SPARSE REFERENCE SIGNAL-RELATED SIGNALING APPARATUS AND METHODS

CROSS-REFERENCE TO RELATED APPLICATION

The present application is a continuation of U.S. patent application Ser. No. 16/556,805 filed on Aug. 30, 2019, the entire contents of which are incorporated herein by reference.

FIELD

This application relates to wireless communications, and in particular to reducing signaling overhead associated with reference signal-related signaling in wireless communication networks.

BACKGROUND

Signaling overhead in wireless communication networks can be a significant concern, in that such overhead occupies network resources that might otherwise be usable for communications. Pilot overhead for channel estimation and acquisition in massive Multiple Input Multiple Output (MIMO) systems, for example, is a substantial drawback.

Reduction in reference signal-related signaling overhead, such as pilot overhead, without significant performance loss in operations such as channel estimation that are based on reference signals, remains a challenge. Signaling overhead reduction might be equivalently seen as providing performance gains relative existing wireless communication systems given the same signaling overhead.

SUMMARY

Embodiments of the present disclosure propose new solutions for sparse reference signal-related signaling and configurations. Correlations between antenna ports are exploited at network equipment such as a base station to reduce reference signal-related signaling overhead, such as for Channel State information Reference Signal (CSI-RS) and Demodulation Reference Signal (DM-RS) signaling for example.

One aspect of this disclosure relates to a method performed by network equipment in a wireless communication network. According to an embodiment, such a method involves communicating, with a User Equipment (UE), sparse reference signal-related signaling for a wireless channel that is associated with multiple antenna ports. The sparse reference signal-related signaling is consistent with a sparse signaling pattern. In an embodiment, the sparse signaling pattern includes reference signal-related signaling associated with each of the antenna ports, and has been determined based on previous reference signal-related signaling previously communicated with the UE or another UE.

Network equipment for a wireless communication network, in accordance with another embodiment, includes antennas associated with multiple antenna ports, a processor coupled to the antennas, and a processor-readable memory coupled to the processor, and storing processor-executable instructions which, when executed by the processor, cause the processor to perform a method. The method is as outlined above in an embodiment, and involves communicating, with a UE, sparse reference signal-related signaling for a wireless channel that is associated with the multiple antenna ports. The sparse reference signal-related signaling is consistent with a sparse signaling pattern that includes reference signal-related signaling associated with each of the antenna ports, and that was determined based on previous reference signal-related signaling previously communicated with the UE or another UE.

Another embodiment relates to a processor-readable memory storing processor-executable instructions which, when executed by a processor in network equipment in a wireless communication network, cause the processor to perform such a method.

According to a further embodiment, a method performed by network equipment in a wireless communication network involves communicating sparse reference signal-related signaling with a UE as noted above, but the sparse reference signal-related signaling is consistent with a varying sparse signaling pattern that is based on previous reference signal-related signaling previously communicated with the UE or another UE.

In a network equipment embodiment, network equipment for a wireless communication network includes, as above, antennas associated with multiple antenna ports, a processor coupled to the antennas, and a processor-readable memory coupled to the processor. The processor-readable memory stores processor-executable instructions which, when executed by the processor, cause the processor to perform a method that involves communicating sparse reference signal-related signaling with a UE. The sparse reference signal-related signaling is consistent with a varying sparse signaling pattern that is based on previous reference signal-related signaling previously communicated with the UE or another UE.

A processor-readable memory may be used to store processor-executable instructions which, when executed by a processor in network equipment in a wireless communication network, cause the processor to perform such a method.

UE embodiments are also disclosed. For example, a method performed by a UE involves communicating, with network equipment in a wireless communication network, sparse reference signal-related signaling for a wireless channel that is associated with multiple antenna ports of the network equipment. In some embodiments, the sparse reference signal-related signaling is consistent with a sparse signaling pattern that includes reference signal-related signaling associated with each of the antenna ports, and the sparse signaling pattern was determined based on previous reference signal-related signaling previously communicated with the UE or another UE. In other embodiments, the sparse reference signal-related signaling is consistent with a varying sparse signaling pattern that is based on previous reference signal-related signaling previously communicated with the UE or another UE.

A UE may include an antenna, a processor coupled to the antenna; and a processor-readable memory, coupled to the processor, and storing processor-executable instructions which, when executed by the processor, cause the processor to perform a method. The method involves communicating, with network equipment in the wireless communication network, sparse reference signal-related signaling for a wireless channel that is associated with multiple antenna ports of the network equipment. As noted above, in some embodiments the sparse reference signal-related signaling is consistent with a sparse signaling pattern that includes reference signal-related signaling associated with each of the antenna ports, and the sparse signaling pattern was determined based on previous reference signal-related signaling previously communicated with the UE or another UE. In other embodiments, the sparse reference signal-related signaling is consistent with a varying sparse signaling pattern that is based on previous reference signal-related signaling previously communicated with the UE or another UE.

A processor-readable memory may be used to store processor-executable instructions which, when executed by a processor in a UE in a wireless communication network, cause the processor to perform such UE methods.

BRIEF DESCRIPTION OF THE DRAWINGS

Embodiments of the disclosure will now be described with reference to the attached drawings in which.

DETAILED DESCRIPTION

Embodiments of the present disclosure are applicable to any of various types of communications. Consider, for example, a Frequency Division Duplex (FDD) system in which a base station or other network equipment is configured to transmit CSI-RS signaling to a User Equipment (UE), which performs Channel State Information (CSI) acquisition and feedback to the base station based on the CSI-RS signaling. The base station then also performs a CSI acquisition procedure based on the feedback from the UE. According to an embodiment, a CSI-RS configuration that involves sparse CSI-RS signaling is determined at the base station, to thereby reduce signaling overhead.

Time Division Duplex (TDD) applications are also possible. In a TDD system, network equipment such as a base station transmits DM-RS to a UE, to enable the UE to perform channel estimation. In some embodiments, the network equipment determines a sparse DM-RS configuration to reduce signaling overhead, and also determines and provides to the UE one or more parameters to enable the UE to partially estimate and partially predict a channel based on the sparse signaling configuration that is applied by the network equipment. Partial channel estimation is performed using reference signals, and channel prediction is performed for any channel elements for which sparse signaling does not include a reference signal. The channel prediction uses the results of partial channel estimation in some embodiments.

In these examples, for FDD applications such as in massive MIMO an objective is to reduce CSI-RS overhead, and for the TDD applications, a goal is to reduce DM-RS overhead. CSI-RS and DM-RS are examples of reference signal-related signaling, and other embodiments may be applied to other types of signaling. For example, CSI feedback from a UE is also a form of reference signal-related signaling, in that the CSI feedback is related to reference signals such as CSI-RS. Therefore, in the present disclosure, reference signal-related signaling is intended to encompass not only signaling that includes reference signals, such as CSI-RS and/or DM-RS, but also signaling that is in some way related to reference signals, including CSI feedback from a UE. Although signaling is used in a general sense herein, it should be appreciated that embodiments may actually serve multiple purposes associated with different types of signaling, such as reducing pilot overhead for CSI-RS and DM-RS for example, and reducing feedback overhead for CSI acquisition and feedback for example; for DM-RS no feedback from a UE is involved. Feedback overhead reduction is a consequence of pilot overhead reduction in some embodiments, and therefore aspects of the present disclosure may involve applying different mechanisms to achieve signaling overhead reduction for different types of signaling.

Figure 1:
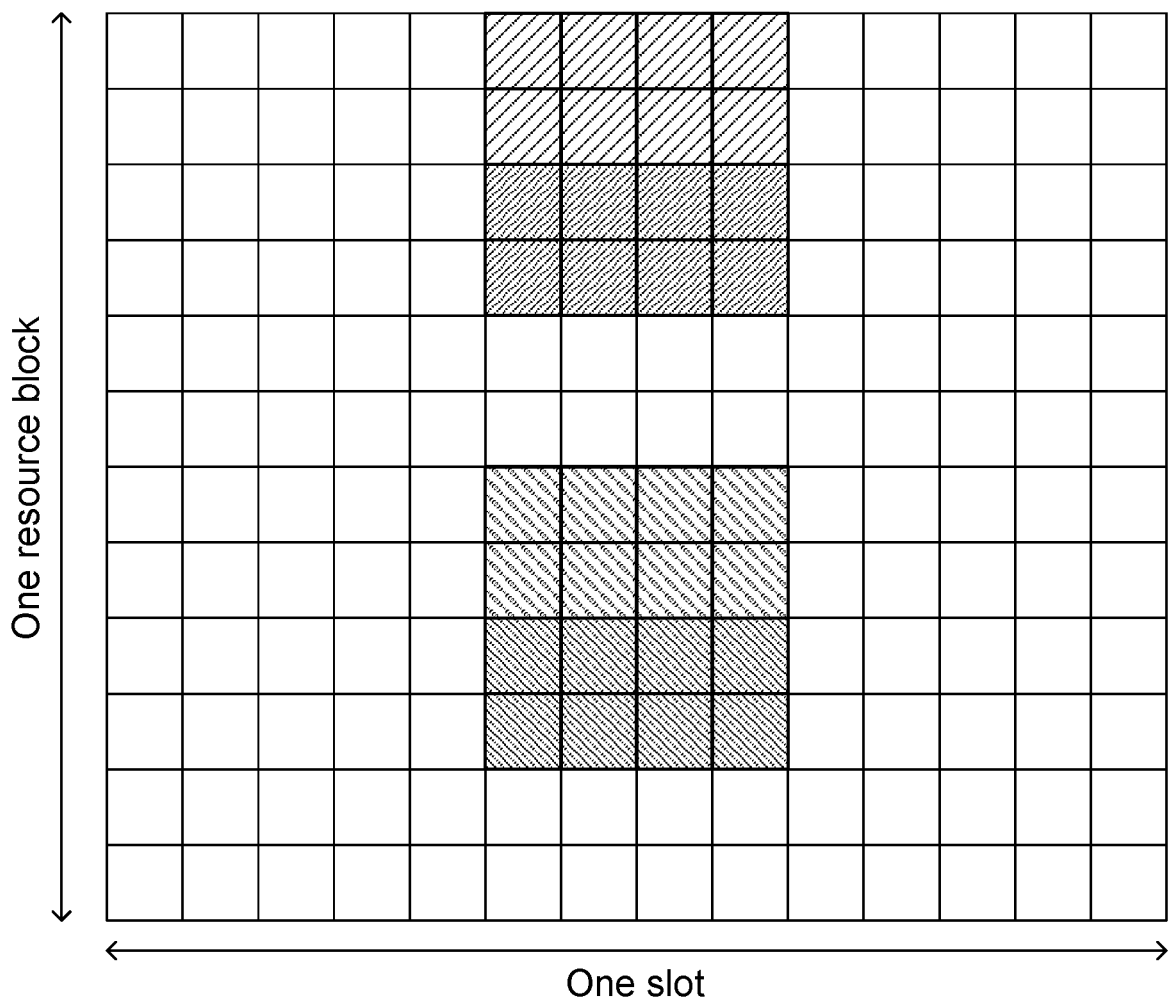
FIG. 1 is a block diagram illustrating a 32-port CSI-RS pattern in a time-frequency grid.

Pilot signaling overhead, for example, may be reduced by taking advantage of channel correlation in time and frequency. FIG. 1 is a block diagram illustrating a 32-port CSI-RS pattern in a time-frequency grid. This pattern is supported in 5th Generation New Radio (5G NR) Release 15, and includes a respective pilot for each antenna port (AP) 0 to 31. The pattern is repeated with configurable periods both in time and frequency, depending on channel correlation in time and frequency.

In addition to correlation in time and frequency, channel correlation across antennas can be utilized to improve performance in such operations as channel acquisition and/or channel estimation. In general, there is correlation across channel coefficients corresponding to different transmit antenna elements from a transmitter. In other words, for a number M of transmit antenna elements and one receive antenna element, coefficients $(h_1, h_2, \ldots, h_M)$ are statistically correlated. Although such correlation is low in a rich scattering propagation environment, the correlation across antennas can be quite significant in a poor scattering environment, with strong Line of Sight (LOS) components and relatively few Non Line of Sight (NLOS) components, for example. If the number of channel parameters (path amplitudes, path delays, Angles of Arrival (AoAs)/Angles of Departure (AoDs)), is smaller than the number of antennas, then generally the channel corresponding to a subset of transmit antennas can be reproduced from the channel corresponding to the rest of the transmit antennas.

See, for example, P. Dong, H. Zhang, and G. Y. Li, "Machine learning prediction based CSI acquisition for FDD massive MIMO downlink," *IEEE GLOBECOM*, December 2018. Using channel correlation across antennas, estimated channels at a subset of antennas are used to predict the channels at other antennas. If the number of channel parameters is significantly less than the number of transmit antennas, then one can construct the channel for antennas without pilots given a sparse pilot pattern. However, this technique is based on transmitting pilots on only a fixed subset of transmit antennas that does not cover all of the transmit antennas. Therefore, as channel conditions move toward a rich scattered environment, channel prediction error for antennas without a pilot can increase dramatically, resulting in unbalanced estimation error on different CSI-RS ports. This technique is also based on narrowband transmission as opposed to wideband transmission, such as Orthogonal Frequency Division Multiplex (OFDM) transmission. Online training to determine channel correlations during communications with UEs is also not supported.

Embodiments disclosed herein provide a novel method to jointly utilize channel correlations in space/time/frequency to reduce overhead for signaling associated with reference signals, such as pilot overhead and/or UE feedback overhead. Reduced density configurations or sparse signaling configurations allow balanced pilot densities across different antenna ports in some embodiments. In other embodiments, different antenna ports have different densities of reference signal-related signaling in a sparse signaling configuration.

Support for online training, in addition to or even instead of offline training, is provided in some embodiments. In offline training, taking an FDD application as an example, a geographic area is surveyed and channels at CSI-RS antenna ports are measured at different locations within the area. Although dense signaling during training may generally be preferred for expected better performance, it may be possible to train as long as channel measurements include some elements in both input and output data sets. Once sufficient channel measurements are collected, a predictor can be developed, by training a Machine Learning (ML) module for example, according to a given pilot pattern. The predictor will then be used at network equipment for predicting one or more elements of a channel vector for the purposes of subsequent communications with UEs. In online training, again taking an FDD application as an example, network equipment collects channel measurement feedback from one or more UEs while the network equipment and the UE are performing normal data transmission. As in offline training, once sufficient channel measurements are collected, a predictor can be developed according to a given pilot pattern and used for the purposes of subsequent communications with UEs, by predicting one or more channel elements for which no reference signals are available.

Online training may be generally preferred, to avoid taking network equipment offline during training. Online training may also be more suitable than offline training to support per-UE training and/or predictors, because UEs that are involved in training are perhaps more likely to also be actively communicating with network equipment after training has been completed.

ML is an emerging and fast-growing field, as a result of advances in computer architecture such as General Purpose Graphics Processing Units (GP-GPUs). As an example, deep Convolutional Neural Networks have attracted attention because of their ability to find patterns in data with intrinsic structure through the use of convolutional filters. The application of ML to the field of communications is largely unexplored and may help outperform existing solutions and/or help reshape wireless networks conceptually. ML modules as referenced herein are intended to be components or blocks based on an implementation of ML mechanisms. One example of an ML implementation is a neural network implemented in hardware, one or more components that execute software, or a combination thereof.

It should be appreciated that ML is used in some embodiments for channel prediction based on sparse reference signal patterns. Although ML may be quite useful and efficient in predicting channel coefficients and/or other parameters for "non-pilot" channels or positions based on sparse reference signal patterns, for example, ML represents only one possible type of implementation. Non-ML embodiments are also possible.

The present disclosure introduces techniques for network equipment to learn or otherwise determine dependencies across channel coefficients in space (antenna/antenna port), time, and frequency. Such dependencies can then be used to determine sparse reference signal patterns, with lower density pilot configurations to reduce pilot overhead for example. Dependencies may also or instead be used to fully recover a channel based on lower density or sparse reference signal patterns, even at missing pilot positions in lower density configurations for example.

Embodiments disclosed herein include example embodiments for CSI-RS pilot overhead reduction, in FDD massive MIMO for example, and for DM-RS pilot overhead reduction, in TDD massive MIMO for example. These embodiments take advantage of channel dependencies across space, time, and frequency in order to reduce reference signal-related signaling overhead.

Figure 2:
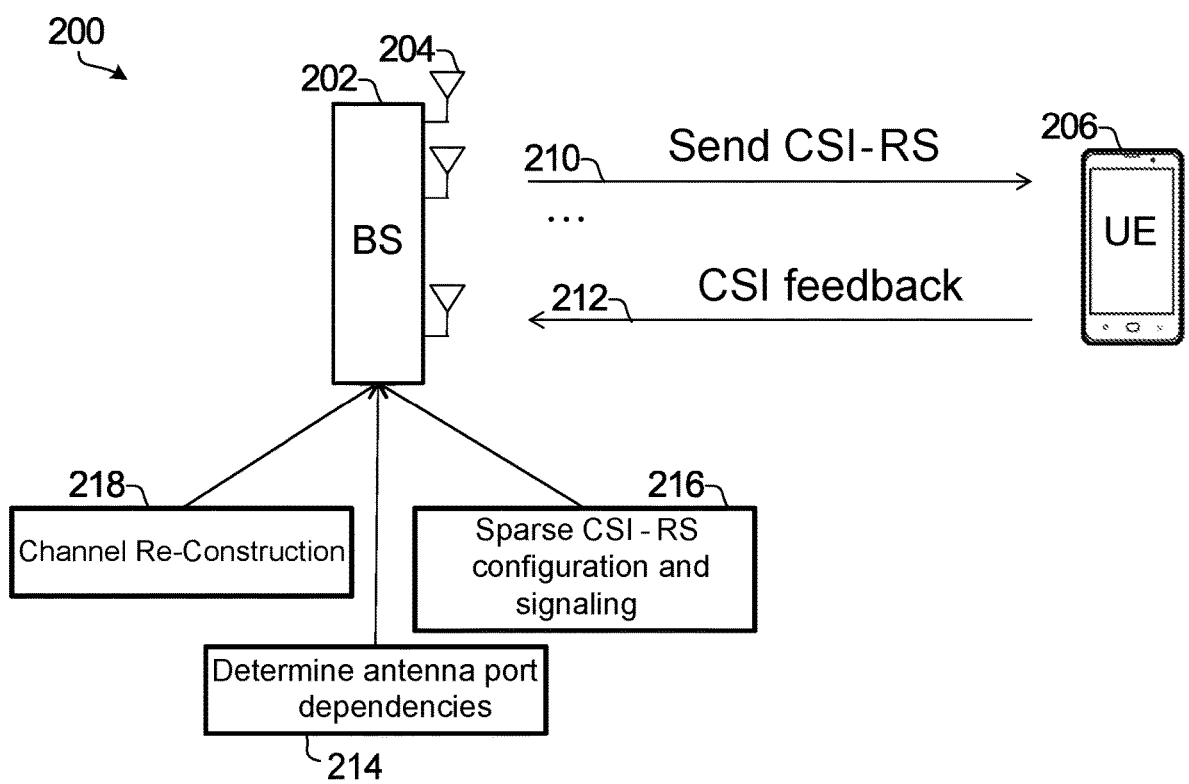
FIG. 2 is a block diagram illustrating a base station (BS) and a UE, and examples of operations that may be performed in some embodiments.

FIG. 2 is a block diagram 200 illustrating a base station (BS) 202 with multiple antenna elements 204, and a UE 206. Each antenna element 204 is associated with an antenna port. An antenna port is a logical construct, and may have one or more than one associated antenna element 204. In an embodiment, an antenna port is defined such that the channel over which a symbol on the antenna port is conveyed can be inferred from the channel over which another symbol on the same antenna port is conveyed. An antenna port may also be referred to as a virtual antenna port or logical antenna port.

Reference signals or pilots such as CSI-RS and DM-RS may be beamformed, using analog beamforming and/or digital beamforming. Antenna ports may therefore be physical antenna ports, or virtual antenna ports that are in effect generated after beamforming.

Virtual antenna ports may also or instead correspond to MIMO layers. Accordingly, antenna ports may include virtual antenna ports that correspond to MIMO layers and/or to beams. The number of virtual antenna ports can be less than the number of physical antenna ports.

It should therefore be appreciated that the teachings herein may be applied to embodiments that support such features as beamforming and/or virtual antenna ports. For example, sparse pilot pattern density may be defined, specified, or considered in terms of pilot or signaling density per (virtual) antenna port, per MIMO layer, and/or per beam.

More detailed examples of a BS and a UE are provided elsewhere herein. Operations that may be performed in some embodiments for CSI-RS overhead reduction in FDD massive MIMO, for example, are shown at 210, 212, 214, 216, 218.

During a training phase in which the BS 202 is determining appropriate sparse reference signal pattern that can be used to reduce overhead without significantly impacting performance in respect of determining channel coefficients or parameters, at 210 the BS transmits CSI-RS signaling, which may be full density signaling in some embodiments, to the UE 206 for the UE to perform channel estimation for the downlink channel from the BS to the UE. Full density signaling is also referred to herein as dense signaling, which is intended to indicate signaling in which all reference signal-related locations or positions are populated with a reference signal such as a pilot or a signal such as a UE feedback signal that is related to a reference signal. In FIG. 1, for example, there are no pilot positions or locations that are not populated or in which a pilot symbol is not transmitted. This is an example of dense signaling.

At 212, the UE 206 transmits to the BS 202 CSI feedback corresponding to the CSI-RS transmit antenna ports through which CSI-RS signaling was transmitted by the BS. 210, 212 are repeated in some embodiments, for different channel realizations due to UE movement for example, until sufficient UE channel estimates are collected by the BS 202.

214 in FIG. 2 represents determination, by the BS 202, of channel dependencies across antenna ports/time/frequency according to past CSI feedback received at 212. ML is used to implement 214 in some embodiments. This is described in more detail by way of example elsewhere herein.

At 216, in some embodiments the BS 202 optimizes a sparse CSI-RS configuration that is to be used for the UE 206, and/or potentially other UEs as well as or instead of the UE 206. A sparse CSI-RS configuration that is determined or otherwise obtained by a BS based on feedback from one UE or set of UEs need not necessarily be subsequently used only for that UE or that set of UEs. For example, the same sparse CSI-RS configuration is used for all UEs at or near the location(s) from which CSI feedback was previously collected for determining or obtaining the sparse CSI-RS configuration.

Sparse CSI-RS signaling is then transmitted by the BS 202, to the same UE 206 and/or potentially another UE, and the UE feeds back CSI corresponding to the CSI-RS transmit antenna ports through which CSI-RS signaling was transmitted by the BS. This is similar to 210, 212 as discussed above, but involves sparse CSI-RS signaling that includes only a subset of the CSI-RSs from more dense CSI-RS signaling at 210, and therefore also involves less CSI feedback from a UE to the BS 202.

At 218, FIG. 2 illustrates a further optional operation of the BS 202 reconstructing channel based on the received CSI feedback. In some embodiments, a channel predictor is also determined by the BS 202 at 214 based on CSI feedback received at 212, to enable one or more coefficients or elements of a channel to be predicted based on subsequently received sparse CSI feedback.

Figure 3:
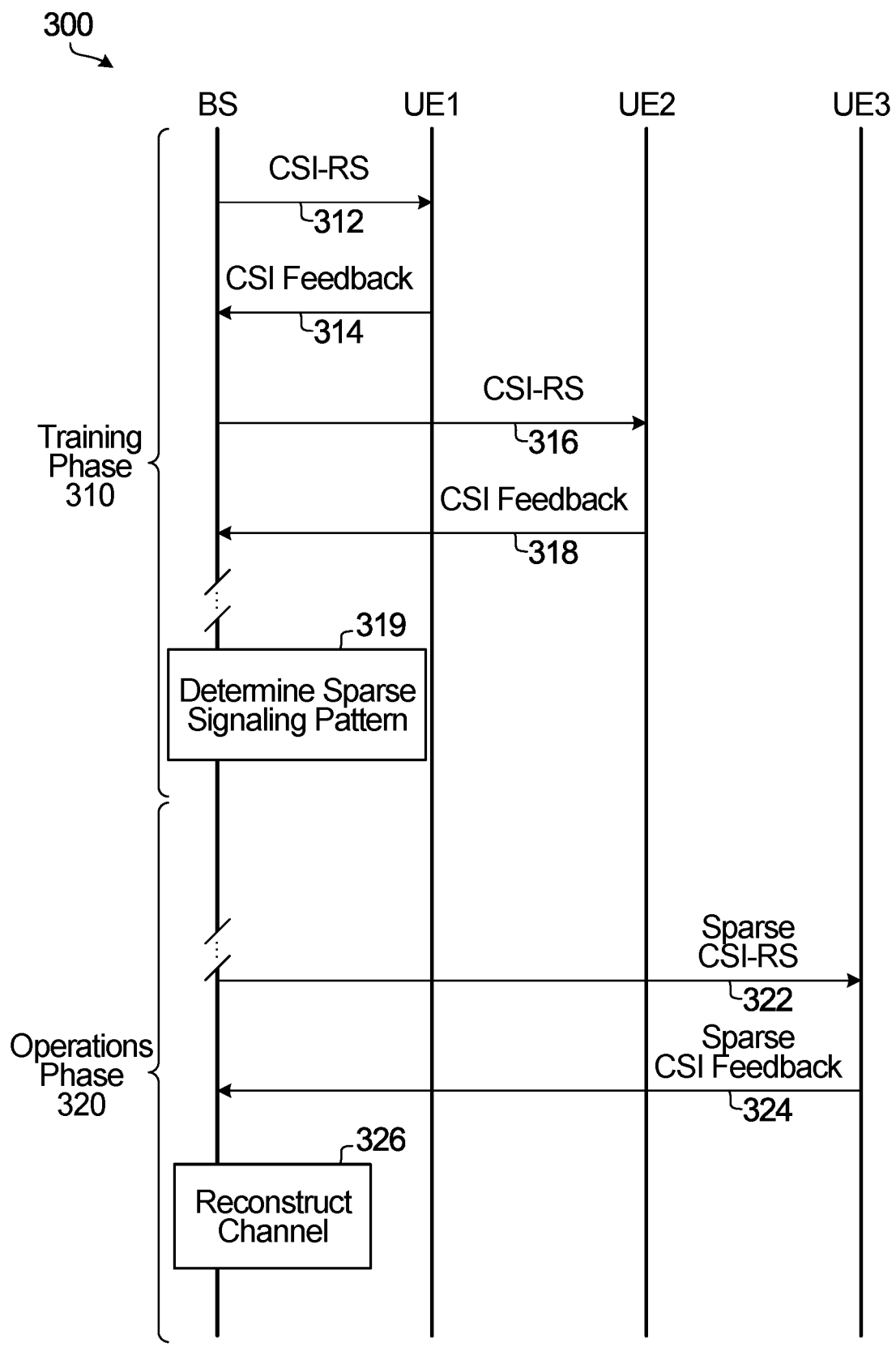
FIG. 3 is a signal flow diagram illustrating BS-UE signaling according to another embodiment.

FIG. 3 is a signal flow diagram illustrating BS-UE signaling according to another embodiment. In the signal flow diagram 300, a BS and two UEs, including UE1 and UE2, are involved in a training phase 310. A CSI-RS/CSI feedback signaling exchange between the BS and UE1 is shown at 312, 314, and a CSI-RS/CSI feedback signaling exchange between the BS and UE2 is shown at 316, 318. These signaling exchanges or communications are similar to those shown at 210, 212 in FIG. 2 and described above. The BS transmits (possibly dense) CSI-RS signaling at 312, 316 and receives corresponding CSI feedback from the UE1 and UE2 at 314, 318.

In some embodiments, each of UE1 and UE2 also provides an indication of current UE location corresponding to the CSI feedback, or the BS otherwise determines the UE locations. UE location information may be useful in embodiments in which training is not necessarily UE-specific, in which case training that is based on feedback from a certain UE or set of UEs is also used for communications with one or more other UEs. For example, the BS may associate UE location information with a sparse reference signal-related signaling configuration that is determined based on CSI feedback received from a UE at one UE location, and then use the same sparse reference signal-related signaling configuration for other UEs at or near that same UE location. In the example shown in FIG. 3, UE1 and UE2 may be at different locations, allowing the BS to collect UE CSI feedback for both locations during the same training phase 310. Although only two UEs are involved in the training phase 310 shown by way of example in FIG. 3, in other embodiments a BS communicates signaling with many more UEs and/or with UEs that move between multiple locations during a training phase.

UE location need not be used only in embodiments in which training is not UE-specific. UE location may also or instead be tracked in embodiments with UE-specific training, to enable a BS to determine when a UE has moved by an amount that may impact channel conditions. Responsive to detection of such movement, the BS may begin to associate received CSI feedback from the UE with a new UE location and/or use the received CSI feedback to determine a sparse reference signal pattern for the new UE location.

The CSI feedback at 314, 318 represent data samples that are collected by the BS. Such samples may be associated with UE location as noted above, and/or with a UE identifier so that a source UE from which each data sample was collected can be tracked. Other information such as transmit antenna port, may also or instead be associated with each collected data sample.

The collected data samples are used by the BS at 319 to determine a sparse reference signal pattern, by training one or more ML modules for example. Data sample collection need not be entirely completed before configuration determination begins at 319. For example, data samples could be used for ML module training as those data samples are collected. Depending on such factors as UE locations and/or whether the training phase 310 is to develop UE-specific sparse reference signal pattern, data samples collected from UE1 and UE2 may be used at 319 in determining multiple sparse reference signal patterns, or one sparse reference signal pattern. In general, a sparse reference signal pattern may be determined based on channel estimation data samples collected from one or more UEs.

In the operations phase 320, the sparse reference signal pattern that is determined at 319 is used at 322 in CSI-RS signaling with UE3. In this example, training is not UE-specific, and the training with UE1 and UE2 during the training phase is applied to one or more other UEs. In other embodiments, the BS uses a sparse reference signal pattern only for the UE(s) that provided the channel estimate data samples based upon which the sparse reference signal pattern was determined.

Channel characteristics may vary depending on UE location, and therefore the particular sparse reference signal pattern that is used at 322 may be UE location-dependent. Although not shown in FIG. 3, the BS may determine the location of UE3, based on a UE location indication provided to the BS by UE3 or in some other way, and obtain a sparse reference signal pattern for the current location of UE3. The BS may select from multiple sparse reference signal patterns based on current UE location, for example.

At 324, CSI feedback is transmitted to the BS by UE3. The CSI feedback is labeled as sparse CSI feedback in FIG. 3, to indicate that the CSI feedback is sparse in the sense that it does not include a full set of CSI feedback. The sparse CSI feedback at 324 includes CSI feedback corresponding to the sparse CSI-RS signaling at 322.

At 326, the BS optionally reconstructs the full channel based on the sparse CSI feedback received at 324. For example, in some embodiments the BS also determines a channel predictor at 319, and uses that channel predictor at 326 to reconstruct the channel even though a full set of CSI feedback is not received at 324.

BS behaviors in FIG. 3 include transmitting (possibly dense) CSI-RS signaling at 312, 316, receiving (possibly dense) CSI feedback at 314, 318, and determining one or more sparse reference signal patterns at 319. Other BS behaviors in FIG. 3 include transmitting sparse CSI-RS signaling at 322, receiving sparse CSI feedback at 324, and optionally reconstructing a channel at 326. There may be other BS behaviors or functions as well. For example, transmitting CSI-RS signaling may involve CSI-RS configuration of a UE, by Radio Resource Control (RRC) signaling for example, and sending CSI-RS signaling. Such CSI-RS configuration may be used to provide a UE with such information as the location(s) of CSI-RS within a time-frequency grid and AP mappings. Actually sending the CSI-RS signaling enables the UE to estimate a channel at transmitted CSI-RS locations.

UE behaviors in FIG. 3 include UE1, UE2 transmitting CSI feedback, and optionally indications of their locations, to the BS at 314, 318, and UE3 transmitting CSI feedback to the BS at 324. UE3 may also transmit an indication of its location to the BS, or the BS may otherwise determine current UE location, before 322.

Embodiments consistent with FIG. 2, FIG. 3, and/or other teachings herein, may be implemented in any of various ways. For example, a neural network may be trained with data samples, such that the neural network learns antenna port dependencies and can be used to determine sparse signaling configurations and/or channel predictors. This type of ML application enables sparse signaling configurations, and/or channel predictors to be obtained and/or optimized during training, and subsequently used for partial channel estimation with sparse signaling and partial channel prediction rather than dense signaling each time channel parameters are to be determined.

Although FIG. 3 illustrates an embodiment that employs a two-phase procedure with a training phase 310 and an operations phase 320, this is not intended to imply that the training phase is necessarily offline. Offline training is only one possible embodiment. Data samples for training may also or instead be collected during live communications with one or more UEs. The CSI-RS signaling at 312, 316 may be part of normal communications between the BS and UE1, UE2, and the BS may transition to sparse CSI-RS signaling for UE1 and/or UE2 after sufficient data samples have been collected during online training.

In some embodiments, UE locations are specified using ordered sets of values according to a coordinate system, such as (x,y) or (x,y,z). There are ways to reduce UE location signaling overhead. For example, UE location information signaled to a BS can be of an incremental value instead of absolute value. UE location is expected to change continuously, rather than discontinuously with significant changes between locations, at least while a UE is actively in use. An example of an incremental value for signaling UE location is a quantized offset indicating a new UE location relative to a previous location. Distance from a previous location could be signaled, for example, as n*D units distance from the previous location, where n is the number of quantized distance units, and D is the quantized direction, such as East, West, North, or South. Multiple increments could be signaled, for example if the UE moves Northwest from its previous location. Sending one or more quantized incremental values may reduce location information overhead compared to sending absolute location information every time a UE is moved.

Similarly, sparse reference signal patterns and/or configurations may be specified in any of various ways. For example, pilot and/or non-pilot antenna port indices for a signaling pattern may be specified in a signaling configuration. Time-frequency grid locations corresponding to pilot and/or non-pilot positions in a signaling pattern may also or instead be specified in a signaling configuration. An ordered pair represents one example of a data element that may be used to specify a location in a two-dimensional grid. A series of ones and zeros could be used to indicate pilot locations for which pilots are (e.g., a "one") and are not (e.g., a "zero") to be transmitted. A pattern for a 32-antenna port embodiment with one pilot location per antenna port, for example, may be specified in a 32-bit binary sequence.

In some embodiments, the locations of base or dense antenna ports in a time-frequency grid are known, and a subset of these locations is signaled using a bitmap, such as a 32-bit binary sequence in the above example. The subset constitutes the sparse pattern. Given a known base pattern, such as a regular, possibly dense pattern, a difference between the base pattern and the sparse pattern may be signaled, through a bitmap sequence or otherwise, instead of signaling the sparse pattern itself. Per-antenna port configuration may be supported, by enabling any individual AP to be designated as pilot or non-pilot. Such pattern differences can be signalled, semi-statically in some embodiments, through RRC signaling for example, or dynamically, through a control channel in dynamic Downlink Control Information (DCI) for example.

These examples relate to defining or specifying a signaling pattern. In some embodiments patterns themselves are indexed or otherwise specified such that details of each pattern can be accessed, determined, or otherwise obtained from a pattern index or other identifier. A pattern index or identifier could be used as a key or lookup in a pattern list or table, stored in memory, to determine exactly where, in a pattern, channel estimation signaling such as pilots should be transmitted. A lookup is just one example of how a pattern index or identifier could be used. Another example is a pattern index or identifier of value "x" specifying the $x^{th}$ pattern in a list or sequence of patterns. Yet another example is a pattern index or identifier corresponding to a binary representation of on-off pilot locations, such as a decimal value pattern index for which a corresponding binary value specifies on and off pilot locations in a pattern.

Pattern indices or identifiers may be particularly useful in a varying pattern that involves switching between multiple patterns. For example, variable or varying reference signal-related signaling may involve hopping or switching between multiple patterns. A signaling configuration may specify a series of pattern indices or identifiers, to thereby define a hopping or switching sequence for a variable or varying signaling pattern. Hopping or switching may also or instead be specified in other ways, such as in terms of a starting location or offset in a sequence of patterns and a step size indicating a sequence location, relative to a current location, of a next pattern that is to be used at a next hopping or switching time or event such as a next resource block and/or a next time slot for example.

A signaling configuration or pattern may be associated, by pattern index for example, with corresponding CSI measurement results or estimates and/or with antenna port, by AP index for example. Such associations may be implicit or explicit, and may be useful in identifying or otherwise obtaining an appropriate predictor for partial channel prediction.

Other configuration options may also be or become apparent. Regardless of the particular type of configuration that is used, configuration information may be stored in memory, included in control signaling such as RRC signaling, or both stored in memory and included in control signaling.

The present disclosure is not limited to any particular form of UE location information or signaling configuration information.

The number of data samples collected and used to determine sparse signaling patterns may be statically or dynamically configured at the BS. Another option for ML embodiments involves monitoring an ML module for convergence, and transitioning from a training phase to an operations phase, or transitioning from relatively more dense signaling to sparse signaling, when a target degree of convergence is reached. Any of various types of cost functions, and/or other convergence testing techniques, may be applied to determine convergence.

Regardless of the specific measure or technique that is used to assess convergence and declare the end of online or offline training, after training is complete one or more sparse signaling patterns are used by the BS to reduce signaling overhead relative to more dense signaling.

Due to communication environment changes possibly affecting LOS and/or NLOS (reflection or diffraction) paths or links for example, training is repeated in some embodiments. Training can be considered semi-static in such embodiments. Re-training may be online or offline.

FIGS. 2 and 3 generally introduce sparse signaling and configurations. Detailed examples are provided below.

Simply for the purpose of illustration, consider an example of learning antenna port dependencies using ML in the context of two dimensions, namely space (transmit antenna port index) and frequency (subcarrier index), and an FDD application with CSI-RS and CSI feedback signaling. Other embodiments may be applied to different and/or more dimensions. For example, spatial correlation may be exploited along with correlations in time and frequency. In some embodiments a channel can be considered in the context of a four-dimensional grid of transmit antenna port index, receive antenna port index, subcarrier index, and OFDM symbol index.

During training, a BS transmits (possibly dense) CSI-RS signaling to a UE so that the UE can estimate the channel at CSI-RS positions (antenna port index, subcarrier index in this example) and feed back CSI to the BS. This process continues for different channel realizations, through UE movement for example, until sufficient UE channel estimates are collected by the BS. A non-dense (sparse) signaling pattern, which may be defined in RRC configuration or other configuration signaling for example, includes a set of points with a pilot or other reference signal ($A_p$) and a set of points without a pilot or other reference signal ($A_{np}$). Although this example refers to pilots, the techniques disclosed with reference to pilots may also or instead be applied to other types of reference signaling.

Figure 4:
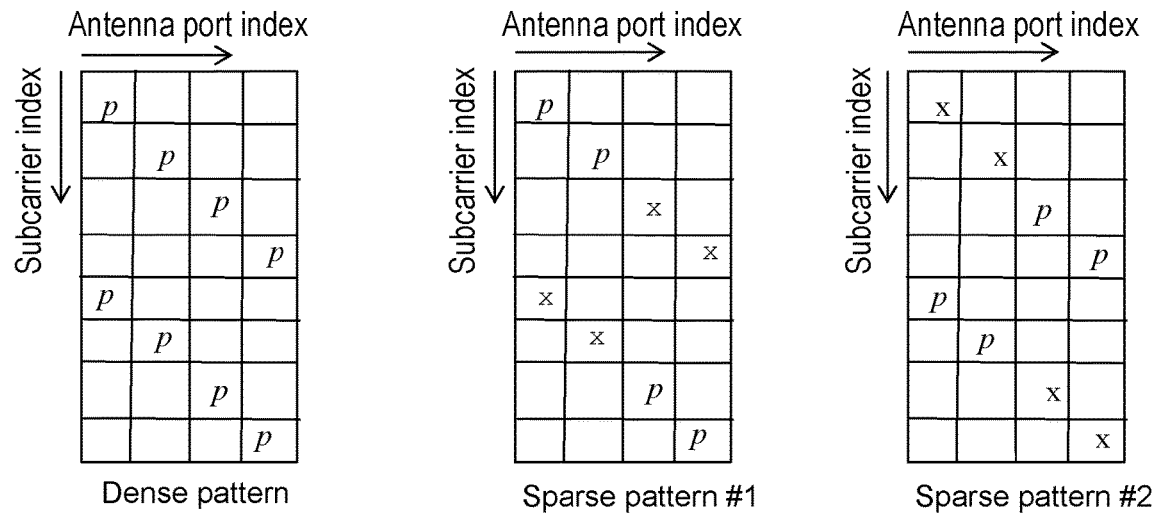
FIG. 4 includes two-dimensional plots of a dense pilot signal pattern and two example sparse patterns #1 and #2.

In one ML embodiment, channel coefficients corresponding to $A_p$ serve as inputs and channel coefficients corresponding to $A_{np}$ are labels or outputs of an ML module. The BS evaluates a number of (sparse) CSI-RS patterns and selects the best one(s) for subsequent CSI-RS transmissions. FIG. 4 includes two-dimensional plots of a dense pilot signal pattern and two example sparse patterns #1 and #2. In FIG. 4, grid points with pilot are labeled "p" and grid points without pilot are labeled "x". The sparse patterns #1 and #2 in FIG. 4 are examples only; other sparse patterns are possible, and further examples are provided elsewhere herein.

In the example shown, the dense pattern includes 2 pilots per antenna port, whereas the sparse patterns #1 and #2 include only one pilot per antenna port. Although all antenna ports still have a pilot in each of the sparse patterns #1 and #2, these patterns are still sparse patterns because they do not include all pilots of the dense pattern. Put another way, the sparse patterns #1 and #2 are half-density relative to the dense pattern in that each antenna port has only one pilot instead of the two pilots in the dense pattern. Pilot density in this example is ½, because there is one pilot in each sparse pattern per two pilots in the dense pattern. More generally, sparse signaling has density of less than one relative to dense signaling.

Figure 5:
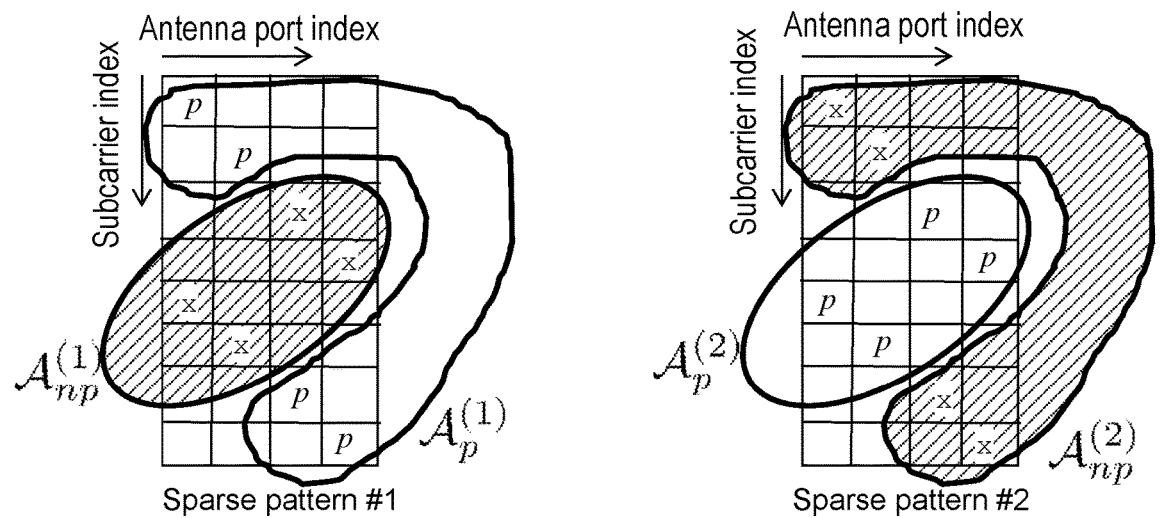
FIG. 5 illustrates examples of ML module training according to two embodiments.
Figure 5:
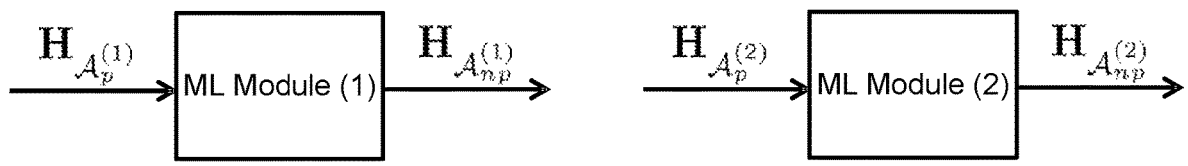

In an embodiment, a BS trains one ML module for each sparse CSI-RS configuration. FIG. 5 illustrates examples of ML module training according to two embodiments, based on the sparse patterns #1 and #2 in FIG. 4. The channel coefficients corresponding to $A_p$ ($H_{Ap}$) serve as inputs and the channel coefficients corresponding to $A_{np}$ ($H_{Anp}$) serve as outputs of each ML module. In FIG. 5, example (1) is shown for sparse pattern #1, and example (2) is shown for sparse pattern #2.

Selection of a sparse signaling pattern may be based on any of various factors. In an embodiment, a sparse pattern that provides better performance than others, based on a metric such as Mean Square Error (MSE) observed for test data using each of a number of candidate pattern for example, is selected for use by a BS.

After a sparse signaling pattern has been selected or otherwise obtained by a BS, the BS transmits CSI-RS signaling that is consistent with that pattern to a UE. As noted elsewhere herein, this includes configuring the UE for the sparse signaling pattern in some embodiments. The UE estimates channels corresponding to the $A_p$ grid points with CSI-RS from the received signaling, and feeds back the channel estimates corresponding to CSI-RS antenna ports to the BS. The BS then uses the channel estimates from the UE to predict channel coefficients on other desired locations on the grid, referred to as $A_{np}$ in the examples above, using a trained ML module in some embodiments.

Figure 6:
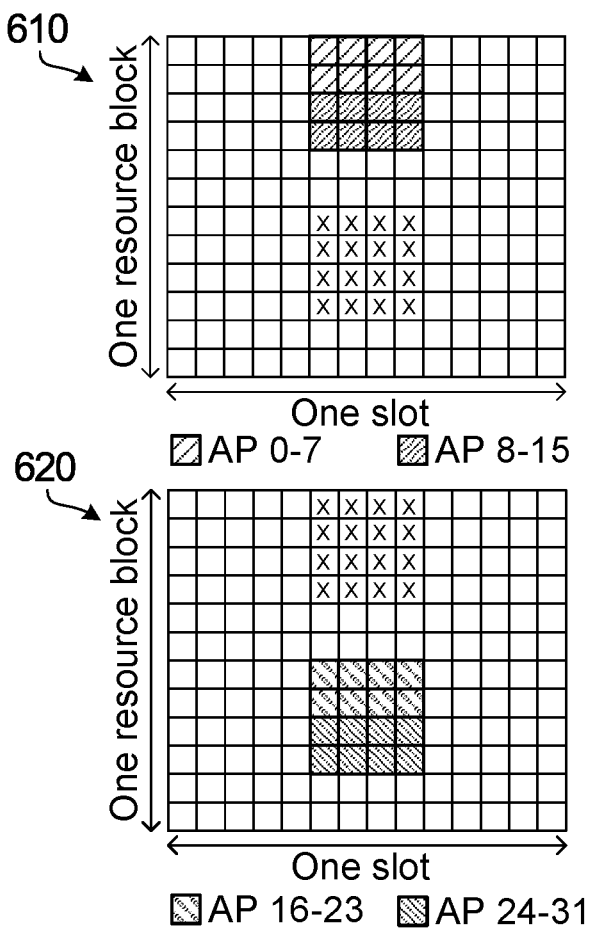
FIG. 6 is a block diagram illustrating, in a time-frequency grid, an example of a varying sparse signaling pattern that includes multiple sparse patterns across Resource Blocks (RBs) within a time slot.
Figure 7:
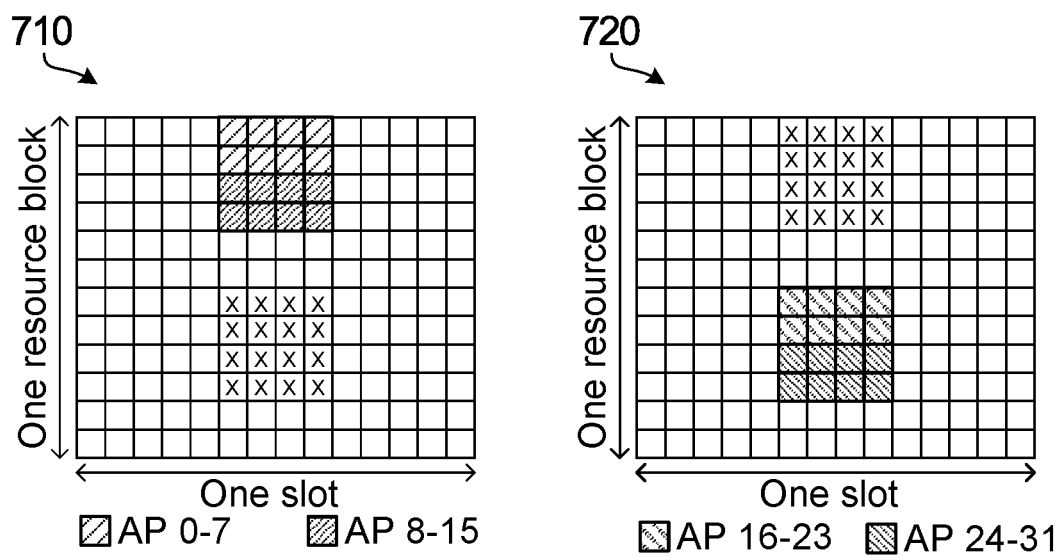
FIG. 7 is a block diagram illustrating, in a time-frequency grid, another example of a varying sparse signaling pattern that includes multiple sparse patterns across multiple time slots.
Figure 8:
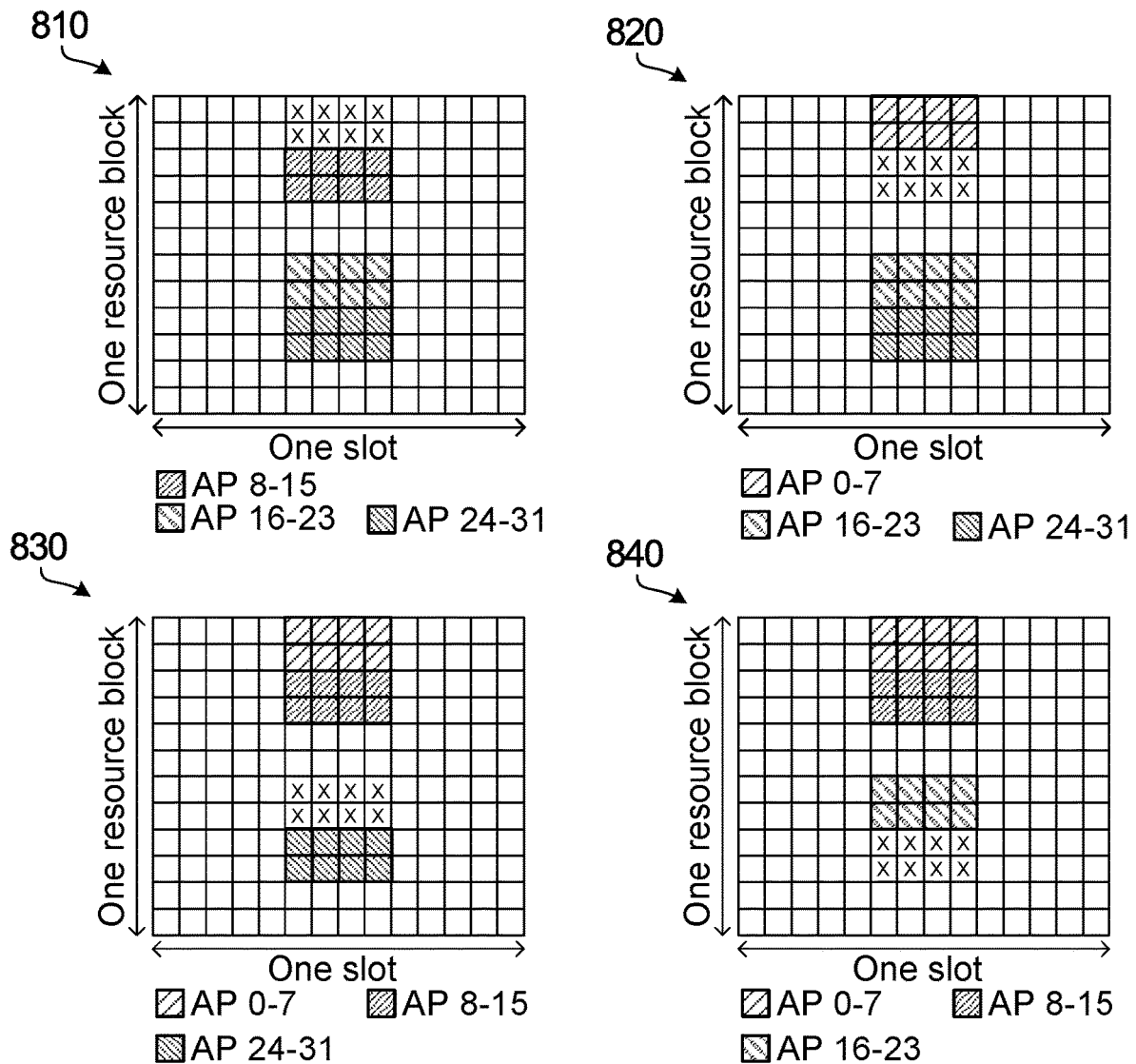
FIG. 8 is a block diagram illustrating, in a time-frequency grid, an example of a varying sparse signaling pattern that includes multiple sparse patterns across both RBs and time slots.
Figure 9:
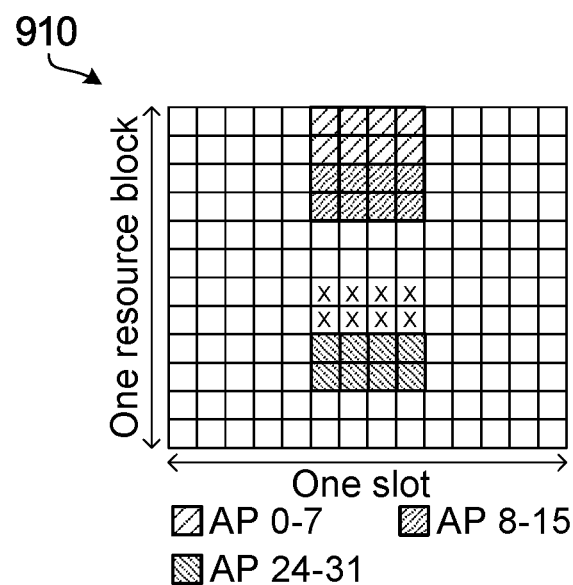
FIG. 9 is a block diagram illustrating, in a time-frequency grid, an example of a varying sparse signaling pattern that includes multiple sparse patterns and provides unequal reference signal-related signaling densities.
Figure 9:
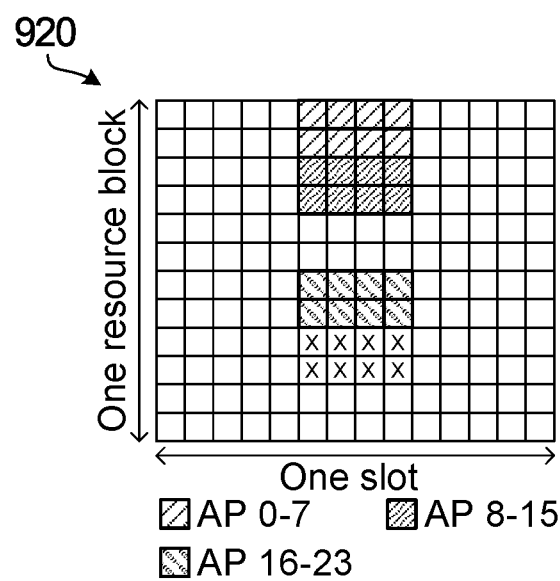

FIG. 6 is a block diagram illustrating, in a time-frequency grid, an example of a varying sparse signaling pattern that includes multiple sparse patterns 610, 620. The example shown in FIG. 6, and other examples in FIGS. 7-9, are for a 32-port CSI-RS pattern and an RB that includes fourteen OFDM symbols. OFDM may be useful to provide an additional pilot dimension. Without OFDM, there is only the "antenna" dimension, and pilots can be sent on a subset of antennas to estimate the channel for those antennas and then predict the channel on antennas without pilots. This will result in unbalanced channel estimation error on different antennas because the channel estimation error is higher for the antennas without pilots. According to an aspect of the present disclosure, however, an additional dimension, provided by OFDM in some embodiments, supports one or more pilots for all antenna ports while reducing pilot density.

In comparison with the dense pattern shown in FIG. 1, the example in FIG. 6 is consistent with a half density configuration in which pilots are transmitted on all antenna ports. This half density configuration is provided by introducing a hopping pattern across multiple resource blocks (RBs) within a same time slot. According to a dense signaling configuration, the pattern in FIG. 1 is transmitted every few RBs. In FIG. 6, only half of the pilots from a dense pattern are transmitted.

In the block diagram shown in FIG. 7, the example varying sparse signaling pattern includes multiple sparse patterns 710, 720, but across multiple time slots. The example in FIG. 7, like the example in FIG. 6, is consistent with a half density configuration relative to the dense pattern in FIG. 1, due to a hopping pattern across multiple time slots. A dense signaling configuration involves transmitting the pattern in FIG. 1 at certain intervals such as every few time slots, whereas in FIG. 7 only half of the pilots from a dense pattern are transmitted.

Turning to FIG. 8, a hopping pattern is introduced to hop or switch between the multiple sparse patterns 810, 820, 830, 840 across both RBs and time slots. Relative to a dense signaling configuration consistent with FIG. 1, the example shown in FIG. 8 has ¾ density.

The examples in FIGS. 6 to 8 provide overall pilot density of ½ or ¾, and each antenna port has equal pilot density. The block diagram in FIG. 9 illustrates an example of a varying sparse signaling pattern that includes multiple sparse patterns 910, 920 and provides unequal signaling densities between some of the antenna ports. In the example shown, APs 0-15 have full density and APs 16-31 have ½ density. Overall density of the varying sparse signaling pattern in FIG. 9 is ¾ relative to the dense pattern shown in FIG. 1 and a dense signaling configuration.

Although a hopping pattern across RBs in one time slot is illustrated in FIG. 9, other hopping patterns such as the examples shown in FIGS. 6 to 8 may be applied to unequal pilot density embodiments.

Other embodiments are also possible. In general, sparse signaling patterns may provide the same or different signaling densities for different antenna ports. In embodiments that involve switching between patterns, such as hopping referenced above in the description of FIGS. 6 to 9, pattern switching may be across or between any one or more of: RBs, time slots, and/or one or more other signaling characteristics or dimensions.

It should also be appreciated that the base 32-port CSI-RS discussed herein is just an example. Embodiments of the present disclosure are applicable to any other CSI-RS pattern, or more generally to other reference signal patterns. Additionally, embodiments that provide different signaling densities for different APs are not in any way restricted to the particular example in FIG. 9. The sparse signaling pattern shown in FIG. 9 is an example of a scenario in which APs 0-15 have density 1 and APs 16-31 have density 0.5. Other patterns with non-equal densities are also possible.

In FDD applications, embodiments disclosed herein may be useful in reducing CSI-RS overhead, or equivalently, increasing channel estimation or prediction performance given the same pilot overhead. Introduction of sparse RS configurations may also or instead help mitigate pilot contamination in FDD massive MIMO, for example.

Training at the BS as opposed to UEs may be more practical, in terms of computational power and power consumption, for example. Furthermore, in some embodiments a BS can select a most appropriate CSI-RS configuration for multiple UEs jointly, rather than per-UE optimization.

TDD applications for DM-RS overhead reduction, in TDD massive MIMO for example, are also contemplated. Dependencies across downlink transmit antennas may be learned or otherwise determined or obtained based on SRS signaling received from a UE. This is discussed in further detail by way of example with reference to FIG. 10, which is a block diagram 1000 illustrating a BS 1002 with multiple antenna elements 1004, and a UE 1006. Each antenna element 1004 is associated with an antenna port. As noted above with reference to FIG. 2, more detailed examples of a BS and a UE are provided elsewhere herein. Operations that may be performed in some embodiments for DM-RS overhead reduction in TDD massive MIMO, for example, are shown at 1010, 1012, 1014, 1016, 1018.

During a training phase, which may be online or offline, the BS 1002 determines appropriate sparse signaling, in this case sparse DM-RS signaling, that can be used to reduce overhead without significantly impacting performance in respect of determining channel coefficients or parameters. At 1010 the UE 1006 transmits SRS signaling to the BS 1002. The BS 1002 estimates the uplink channel from the UE 1006 to the BS, based on the received SRS signaling. Due to channel reciprocity in TDD mode, the downlink channel is the same as the uplink channel.

Figure 10:
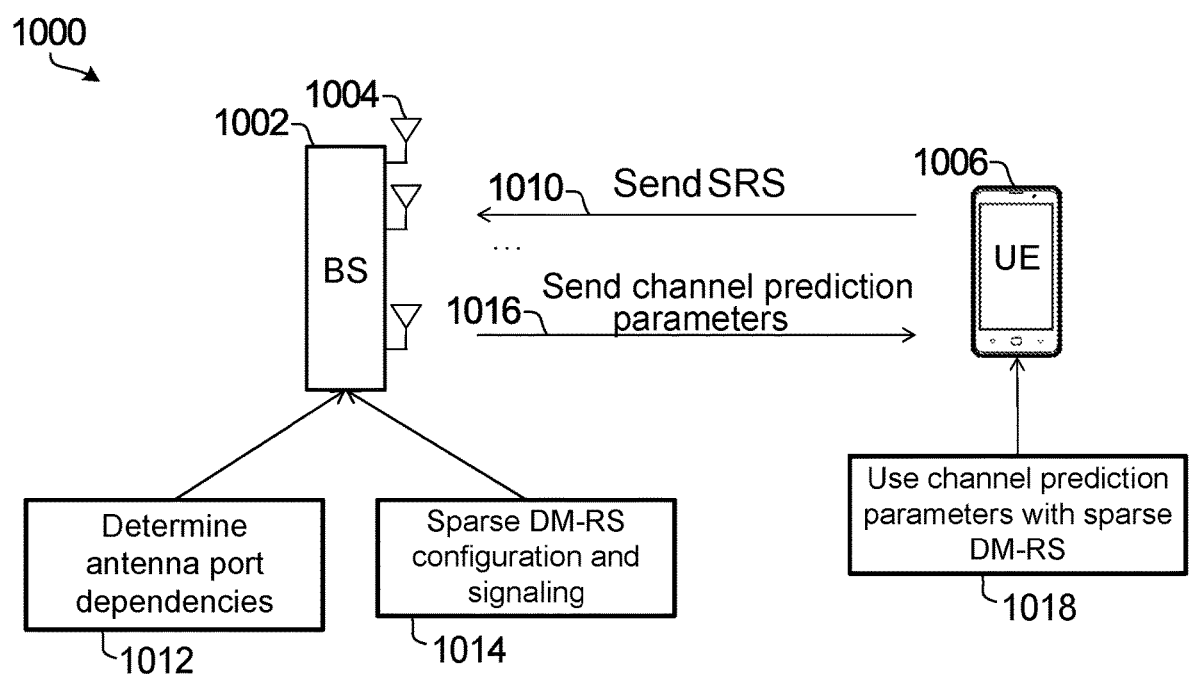
FIG. 10 is a block diagram illustrating a BS and a UE, and examples of operations that may be performed in further embodiments.

1012 in FIG. 10 represents determination, by the BS 1002, of channel dependencies across transmit DM-RS antenna ports/time/frequency according to the received SRS signaling. ML is used to implement 1012 in some embodiments. ML examples and others provided herein, including those disclosed in the context of CSI-RS embodiments, may also or instead be applied in determining antenna port dependencies in DM-RS overhead reduction embodiments, and generally to embodiments intended to reduce overhead associated with other types of signaling.

At 1014, the BS 1002 in some embodiments optimizes a sparse DM-RS signaling pattern that is to be used for the UE 1006, and/or potentially other UEs as well as or instead of the UE. Examples of how a sparse signaling pattern may be determined are provided elsewhere herein, and may be implemented in a TDD/DM-RS application.

A sparse DM-RS pattern that is determined or otherwise obtained by a BS based on feedback from one UE or set of UEs need not necessarily be subsequently used only for that UE or that set of UEs. For example, the same sparse DM-RS pattern is used for all UEs at or near the location(s) from which SRS signaling was previously received and used for determining or obtaining the sparse DM-RS pattern.

The BS 1002 also determines, and sends to a UE at 1016, one or more parameters to be used by the UE at 1018 in partially predicting the channel from channel estimates based on the sparse DM-RS signaling in accordance with the sparse DM-RS signaling pattern. The channel prediction parameter(s) determined or otherwise obtained by the BS 1002 and transmitted to a UE at 1016 may include ML parameters for a trained ML module, for example. A UE that receives the sparse DM-RS signaling according to the sparse signaling pattern determined by the BS is then able to partially estimate the channel and then partially predict the channel using the received parameter(s).

Figure 11:
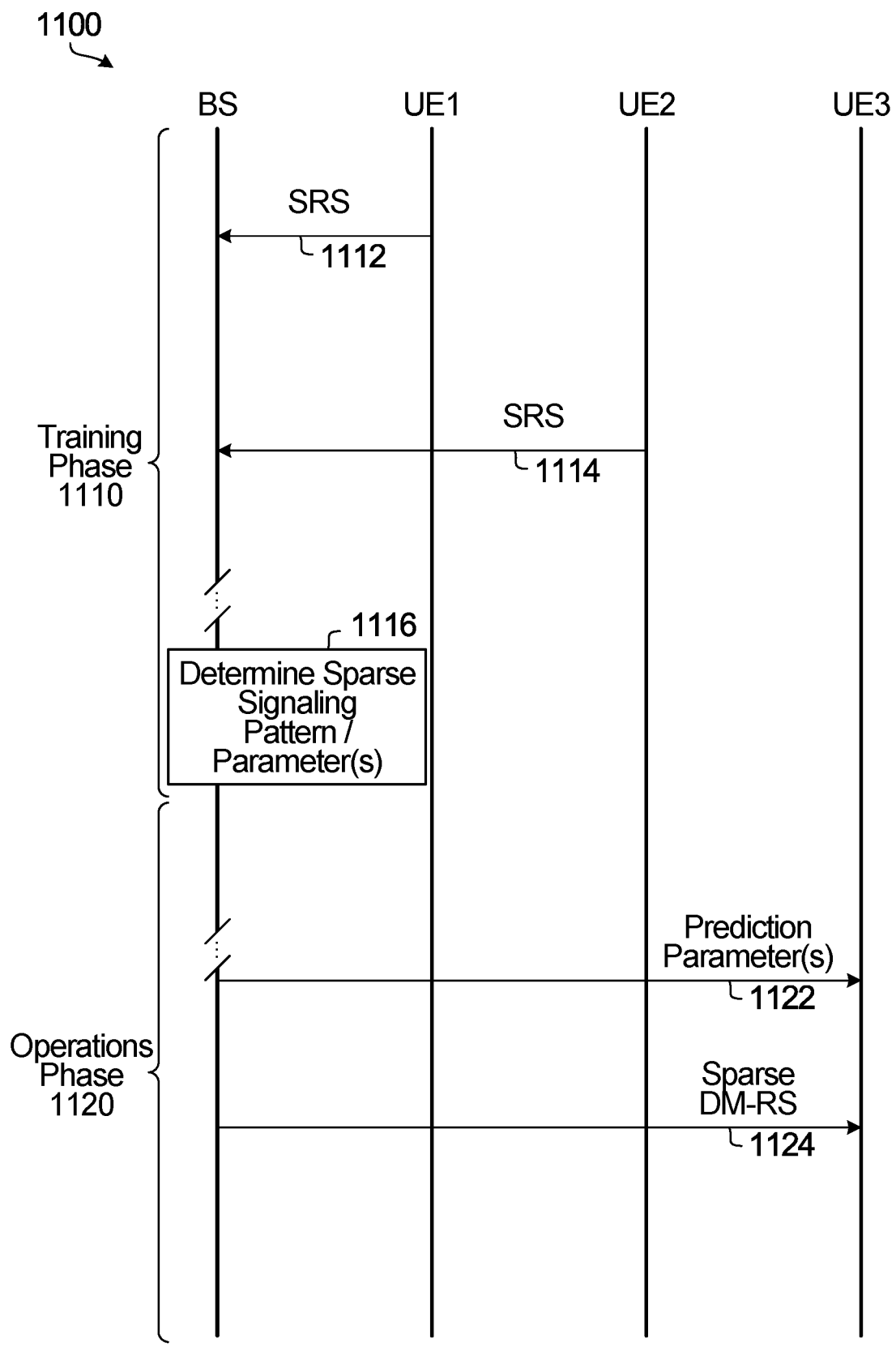
FIG. 11 is a signal flow diagram illustrating BS-UE signaling according to another embodiment.

FIG. 11 is a signal flow diagram illustrating BS-UE signaling according to another embodiment. In the signal flow diagram 1100, a BS and two UEs, including UE1 and UE2, are involved in a training phase 1110. The training phase 1110 in FIG. 11 may be offline or online.

In FIG. 11, a signaling exchange or communication during the training phase 1110 involves the BS receiving SRS signaling from UE1 and UE2 at 1112, 1114. This exchange or communication is similar to 1010 in FIG. 10 and described above. Although only two UEs are involved in the training phase 1110 shown by way of example in FIG. 11, in other embodiments a BS exchanges or communicates signaling with many more UEs and/or with UEs that move between multiple locations during a training phase.

In some embodiments, each of UE1 and UE2 also provides an indication of current UE location corresponding to the SRS signaling, or the BS otherwise determines the UE locations. Examples of how UE location information may be specified and applied are provided elsewhere herein.

The SRS signaling at 1112, 1114 enables the BS to collect data samples, which may be associated with UE location as noted above and/or with a UE identifier so that a source UE from or for which each data sample was collected can be tracked. Other information such as antenna port, may also or instead be associated with each collected data sample.

The collected data samples are used by the BS at 1116 to determine a sparse signaling pattern and one or more prediction parameters for use by a UE. This may involve training one or more ML module(s) for example. Data sample collection need not be entirely completed before sparse pattern determination begins at 1116. For example, data samples could be used for ML module training as those data samples are collected. Depending on such factors as UE locations and/or whether the training phase 1110 is to develop UE-specific sparse signaling configurations and/or parameters, data samples collected from UE1 and UE2 may be used at 1116 in determining multiple sparse signaling patterns and/or multiple sets of one or more parameters, or one sparse signaling pattern and/or one parameter set. In general, a sparse signaling pattern and/or a parameter set may be determined based on channel estimation data samples collected from, or based on SRS signaling received from, one or more UEs.

In the operations phase 1120, the sparse signaling pattern and parameter(s) determined at 1116 are used at 1122, 1124. In this example, training is not UE-specific, and the training with UE1 and UE2 during the training phase is applied to one or more other UEs including UE3. In other embodiments, the BS uses a sparse signaling pattern and parameter(s) only for the UE(s) that were involved in training.

As noted above, channel characteristics may vary depending on UE location, and therefore the particular sparse signaling pattern and parameter(s) used at 1122, 1124 may be UE location-dependent. Although not shown in FIG. 11, the BS may determine the location of UE3, based on a UE location indication provided to the BS by UE3 or in some other way, and obtain a sparse signaling pattern and parameter(s) for the current location of UE3. The BS may select from multiple sparse signaling patterns and parameter sets based on current UE location, for example.

At UE3, the prediction parameter set received at 1122 is used in partial channel prediction, based on partial channel estimation that is performed using the sparse DM-RS signaling received at 1124.

BS behaviors in FIG. 11 include receiving SRS signaling at 1112, 1114 and determining one or more sparse signaling patterns and one or more parameter sets at 1116 based on the SRS signaling. Other BS behaviors in FIG. 3 include transmitting a parameter set and sparse DM-RS signaling at 1122, 1124.

UE behaviors in FIG. 11 include UE1, UE2 transmitting SRS signaling and optionally indications of their locations to the BS at 1112, 1114, and UE3 performing partial channel estimation based on the sparse DM-RS signaling received at 1122 and partial channel prediction based on the parameter(s) received at 1124. UE3 may also transmit an indication of its location to the BS, or the BS may otherwise determine current UE location, before 1122.

Implementation options disclosed elsewhere herein, with reference to FDD/CSI-RS embodiments for example, may also or instead be applied to TDD/DM-RS embodiments and/or to other embodiments. Variations disclosed elsewhere herein may similarly apply to TDD/DM-RS embodiments and/or to other embodiments.

Figure 12:
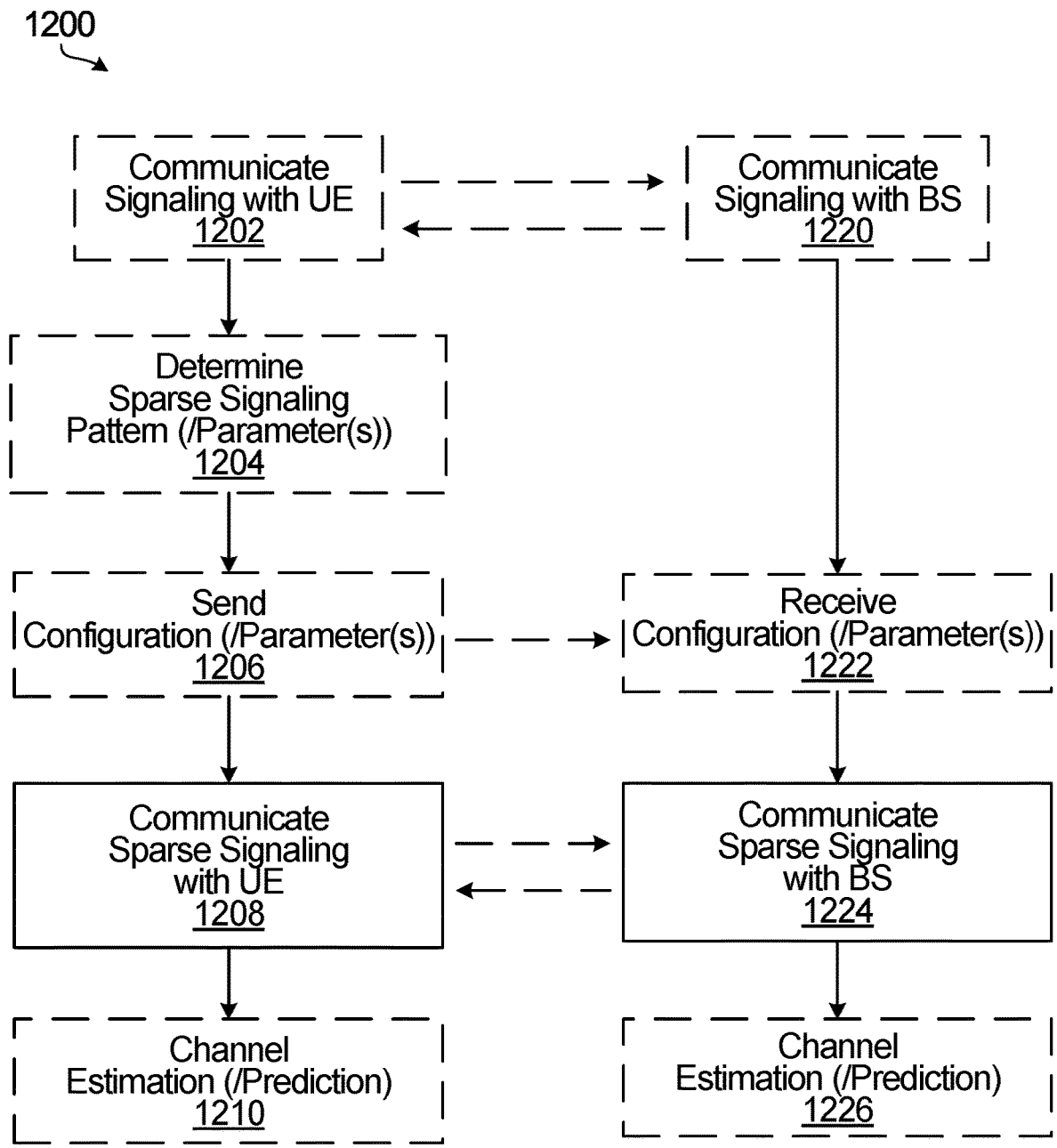
FIG. 12 is a flow chart illustrating an example of a method according to an embodiment.

FIG. 12 is a flow chart illustrating an example of a method according to an embodiment. The flow chart 1200 includes both network-side operations 1202, 1204, 1206, 1208, 1210 and UE-side operations 1220, 1222, 1224, 1226.

Although FIG. 12 shows other operations, in some embodiments the core of a method performed by network equipment in a wireless communication network involves communicating, with a UE, sparse reference signal-related signaling for a wireless channel that is associated with multiple antenna ports. This is shown at 1208. The network equipment may transmit signaling to a UE and/or receive signaling from a UE. Similarly, one or more UEs may transmit signaling to a BS and/or receive signaling from a BS at 1224. The sparse reference signal-related signaling is consistent with a sparse signaling pattern that includes reference signal-related signaling associated with each of the antenna ports in some embodiments.

The sparse signaling pattern may be determined based on previous reference signal-related signaling that was previously communicated with the UE or another UE, as shown by way of example at 1202, 1220, during a training phase as shown in FIG. 3 or FIG. 11 for example. Network equipment may receive such previous reference signal-related signaling at 1202 and determine the sparse signaling pattern based on the previous reference signal-related signaling at 1204. Examples of signaling communicated between network equipment and one or more UEs for determining a sparse signaling configuration are shown at 312, 314 and 316, 318 in FIG. 3, and at 1112, 1114 in FIG. 11. All of these types of signaling in FIGS. 3 and 11 are illustrative examples of reference signal-related signaling based upon which a sparse signaling pattern may be determined at 1204.

The determining at 1204 may involve determining, based on the previous reference signal-related signaling received at 1202, correlations between the antenna ports, and determining the sparse signaling pattern based on the correlations. Correlation between antenna ports enables estimation of channels corresponding to a subset of antenna ports given the channels corresponding to a different subset of antenna ports, as described in elsewhere herein. It should be appreciated that correlation is not limited to correlation across antenna ports. There may also be correlation across frequency and time, for example.

Training during which a sparse signaling pattern is determined may be offline or online. For offline training, the previous reference signal-related signaling is received at 1202 for offline operation that is separate from reference signal-related signaling at 1208 for communications with a UE. For online training, reference signal-related signaling is for online operation that is associated with communications with a UE. Therefore, although not shown in FIG. 12, the signaling exchanged or communicated at 1202, 1220 may be used by network equipment and/or a UE for channel estimation.

In some embodiments, the sparse reference signal-related signaling communicated at 1210, 1226 includes a CSI-RS associated with each of the antenna ports and UE feedback corresponding to each CSI-RS. At the network equipment, the communicating at 1208 may then include transmitting to the UE the CSI-RS associated with each of the antenna ports and receiving from the UE the feedback corresponding to each CSI-RS. At the UE side, such an embodiment may include receiving the CSI-RS associated with each of the antenna ports, and generating and transmitting to the network equipment the feedback corresponding to each CSI-RS.

Another example of reference signal-related signaling is a DM-RS associated with each of the antenna ports. The communicating at 1208 may then involve transmitting to the UE the DM-RS associated with each of the antenna ports.

For sparse DM-RS signaling, and/or possibly in other embodiments, sparse signaling may involve UE configuration for the sparse signaling. For illustrative purposes, this is shown in FIG. 12 at 1206, 1222, and examples of how a configuration may be signaled to a UE are provided elsewhere herein. As part of UE configuration, or possibly separately, one or more parameters for channel prediction of the wireless channel based on the sparse reference signal-related signaling are transmitted to the UE at 1206. Network equipment may determine the parameter(s) at 1204, during training for example.

Partial channel estimation and partial channel prediction may be performed at 1210, 1226, by either or both of network equipment and a UE.

According to another aspect of the present disclosure, the sparse reference signal-related signaling communicated with a UE at 1208 is consistent with a varying sparse signaling pattern that is based on previous reference signal-related signaling previously communicated with the UE or another UE, at 1202 for example. Features that are disclosed elsewhere herein, including those described above with reference to FIG. 12, may be implemented in conjunction with a varying sparse signaling pattern.

For example, embodiments may include any one or more of the following features, in any of various combinations:
  receiving the previous reference signal-related signaling, at 1202 for example;
  determining the varying sparse signaling pattern based on the previous reference signal-related signaling, at 1204 for example;
  the reference signal-related signaling is or includes CSI-RSs associated with the antenna ports and UE feedback corresponding to each of the CSI-RSs;
  the communicating, at 1202 and/or 1208 for example, involves transmitting to the UE the CSI-RSs;
  the reference signal-related signaling is or includes DM-RSs associated with the antenna ports;
  the communicating, at 1202 and/or 1208 for example, involves transmitting the DM-RSs to the UE;
  the communicating, at 1202 and/or 1208 for example, involves transmitting the sparse reference signal-related signaling to the UE;
  transmitting to the UE, at 1206 for example, one or more parameters for prediction of the wireless channel based on the sparse reference signal-related signaling;
  the sparse reference signal-related signaling includes reference signal-related signaling associated with each of the antenna ports.

Other features may also or instead be provided. As an example, in some embodiments a varying sparse signaling pattern includes multiple sparse signaling patterns. These multiple patterns are associated with respective ones of multiple predictors for channel prediction based on the sparse signaling patterns in some embodiments. In other embodiments, there are multiple constituent patterns in a varying sparse signaling pattern and one predictor is associated with the overall varying pattern, rather than each constituent pattern having its own predictor.

With multiple patterns in a varying sparse signaling pattern, a method may involve switching between different ones of the multiple patterns. In some embodiments, a method also involves determining, based on a current sparse signaling pattern, a predictor to be used with that pattern.

Sparse reference signal-related signaling may be communicated with a UE in multiple RBs, in which case there may be switching between different sparse signaling patterns for different RBs of the multiple RBs. In other embodiments, sparse reference signal-related signaling is communicated with a UE in multiple time slots, and there is switching between different sparse signaling patterns for different time slots of the multiple time slots. Switching may also or instead be implemented in embodiments in which sparse signaling is communicated with the UE in multiple RBs and multiple time slots, and switching may then involve switching between different sparse signaling patterns for different RBs of the multiple RBs and for different time slots of the multiple time slots. Illustrative examples of all of these switching options are shown in FIGS. 6 to 9.

FIG. 12 and the description thereof are intended solely to provide further illustrative examples of method embodiments. Other embodiments may include more, fewer, and/or different operations, performed in a similar or different order. There may also be various ways to perform operations in a method, including those disclosed elsewhere herein.

Figure 13:
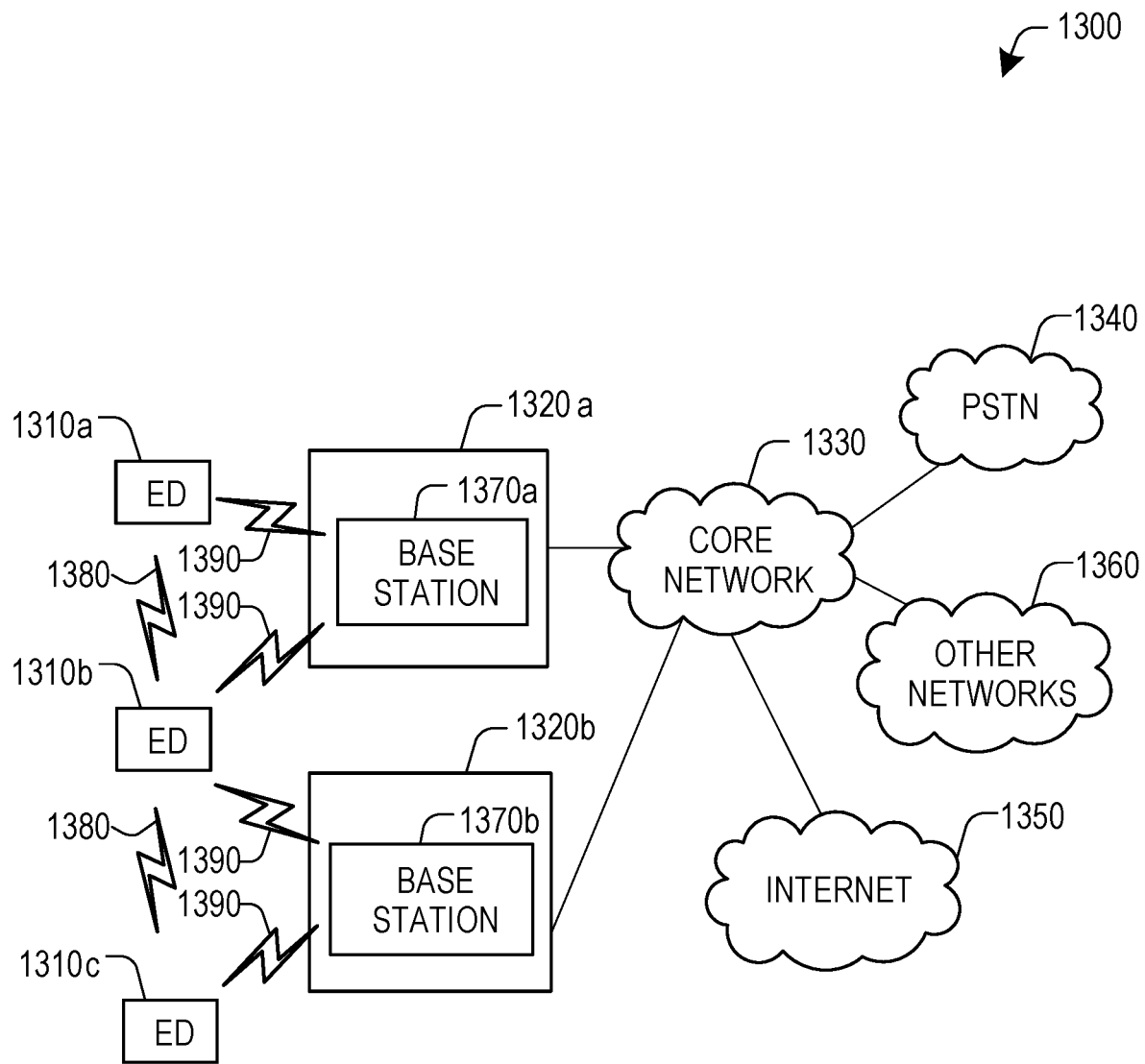
FIG. 13 illustrates an example communication system in which embodiments of the present disclosure could be implemented.

Various embodiments are disclosed by way of example above. FIG. 13 illustrates an example communication system 1300 in which embodiments of the present disclosure could be implemented. In general, the communication system 1300 enables multiple wireless or wired elements to communicate data and other content. The purpose of the communication system 1300 may be to provide content (voice, data, video, text) via broadcast, narrowcast, user device to user device, etc. The communication system 1300 may operate by sharing resources such as bandwidth.

In this example, the communication system 1300 includes electronic devices (ED) 1310*a*-1310*c*, radio access networks (RANs) 1320*a*-1320*b*, a core network 1330, a public switched telephone network (PSTN) 1340, the internet 1350, and other networks 1360. Although certain numbers of these components or elements are shown in FIG. 13, any reasonable number of these components or elements may be included in the communication system 1300.

The EDs 1310*a*-1310*c* are configured to operate, communicate, or both, in the communication system 1300. For example, the EDs 1310*a*-1310*c* are configured to transmit, receive, or both via wireless or wired communication channels. Each ED 1310*a*-1310*c* represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 13, the RANs 1320*a*-1320*b* include base stations 1370*a*-1370*b*, respectively. Each base station 1370*a*-1370*b* is configured to wirelessly interface with one or more of the EDs 1310*a*-1310*c* to enable access to any other base station

1370a-1370b, the core network 1330, the PSTN 1340, the internet 1350, and/or the other networks 1360. For example, the base stations 1370a-1370b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 1310a-1310c may be alternatively or additionally configured to interface, access, or communicate with any other base station 1370a-1370b, the internet 1350, the core network 1330, the PSTN 1340, the other networks 1360, or any combination thereof. The communication system 1300 may include RANs wherein the corresponding base station accesses the core network 1330 via the internet 1350. In some embodiments the EDs 1310a-1310c include EDs that are able to communicate directly with each other through links 1380.

The EDs 1310a-1310c and base stations 1370a-1370b are examples of communication equipment that can be configured to implement some or all of the functionality and/or embodiments described herein. In the embodiment shown in FIG. 13, the base station 1370a forms part of the RAN 1320a, which may include other base stations, base station controller(s) (BSC), radio network controller(s) (RNC), relay nodes, elements, and/or devices. Any base station 1370a, 1370b may be a single element, as shown, or multiple elements, distributed in the corresponding RAN, or otherwise. Also, the base station 1370b forms part of the RAN 1320b, which may include other base stations, elements, and/or devices. Each base station 1370a-1370b transmits and/or receives wireless signals within a particular geographic region or area, sometimes referred to as a "cell" or "coverage area". A cell may be further divided into cell sectors, and a base station 1370a-1370b may, for example, employ multiple transceivers to provide service to multiple sectors. In some embodiments there may be established pico or femto cells where the radio access technology supports such cells. In some embodiments, multiple transceivers could be used for each cell, for example using multiple-input multiple-output (MIMO) technology. The number of RANs 1320a-1320b shown is an example only. Any number of RANs may be contemplated when devising the communication system 1300.

The base stations 1370a-1370b communicate with one or more of the EDs 1310a-1310c over one or more air interfaces 1390 using wireless communication links e.g. radio frequency (RF), microwave, infrared (IR), etc. The air interfaces 1390 may utilize any suitable radio access technology. For example, the communication system 1300 may implement one or more channel access methods, such as code division multiple access (CDMA), time division multiple access (TDMA), frequency division multiple access (FDMA), orthogonal frequency division multiple access (OFDMA), or single-carrier FDMA (SC-FDMA) in the air interfaces 1390.

A base station 1370a-1370b may implement Universal Mobile Telecommunication System (UMTS) Terrestrial Radio Access (UTRA) to establish an air interface 1390 using wideband CDMA (WCDMA). In doing so, the base station 1370a-1370b may implement protocols such as HSPA, HSPA+ optionally including HSDPA, HSUPA or both. Alternatively, a base station 1370a-1370b may establish an air interface 1390 with Evolved UTMS Terrestrial Radio Access (E-UTRA) using LTE, LTE-A, and/or LTE-B. It is contemplated that the communication system 1300 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 1320a-1320b are in communication with the core network 1330 to provide the EDs 1310a-1310c with various services such as voice, data, and other services. The RANs 1320a-1320b and/or the core network 1330 may be in direct or indirect communication with one or more other RANs (not shown), which may or may not be directly served by core network 1330, and may or may not employ the same radio access technology as RAN 1320a, RAN 1320b or both. The core network 1330 may also serve as a gateway access between (i) the RANs 1320a-1320b or EDs 1310a-1310c or both, and (ii) other networks (such as the PSTN 1340, the internet 1350, and the other networks 1360). In addition, some or all of the EDs 1310a-1310c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 1350. PSTN 1340 may include circuit switched telephone networks for providing plain old telephone service (POTS). Internet 1350 may include a network of computers and subnets (intranets) or both, and incorporate protocols, such as IP, TCP, UDP. EDs 1310a-1310c may be multimode devices capable of operation according to multiple radio access technologies, and incorporate multiple transceivers necessary to support such radio access technologies.

Figure 14A:
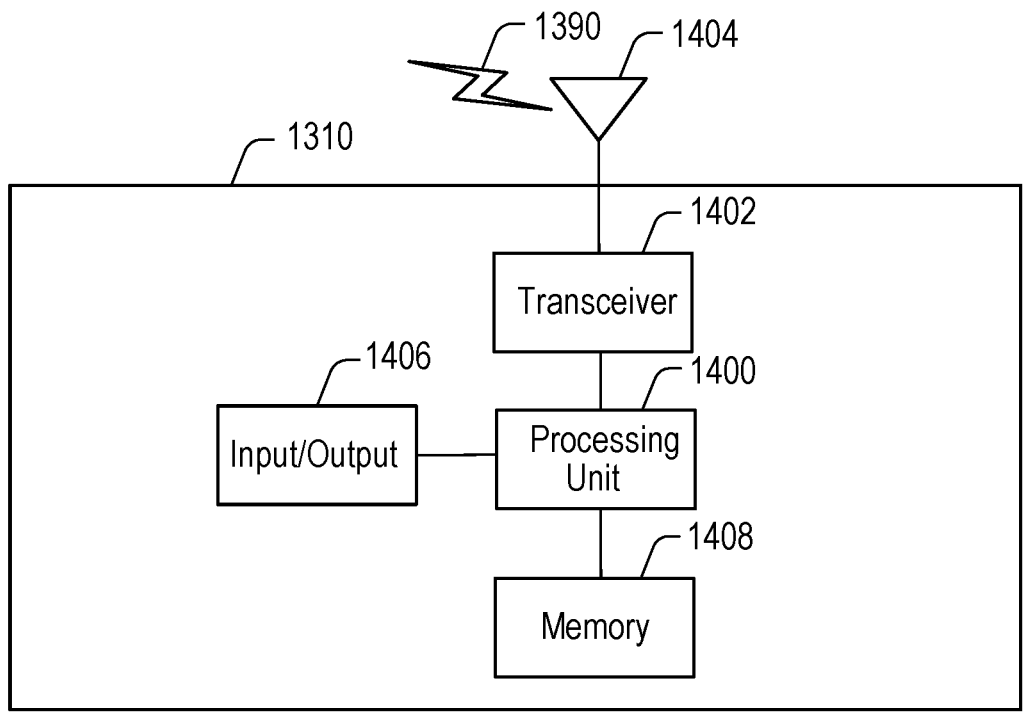
FIG. 14A is a block diagram of an example electronic device.
Figure 14B:
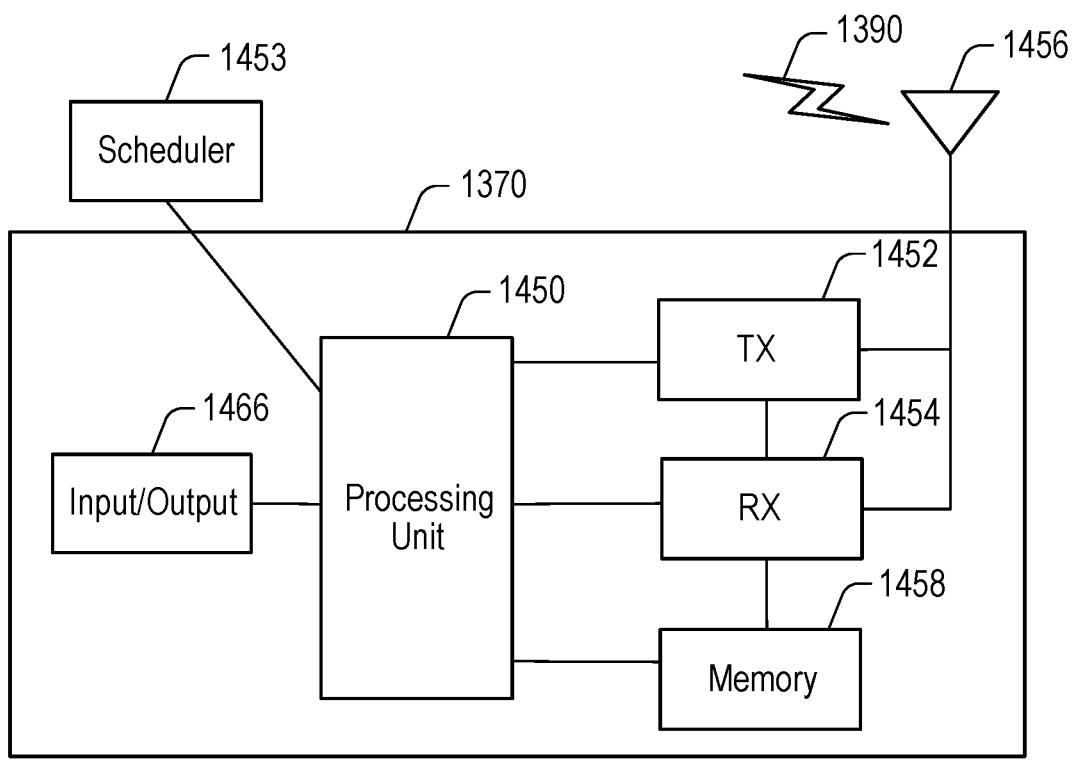
FIG. 14B is a block diagram of an example base station.

FIGS. 14A and 14B illustrate example devices that may implement the methods and teachings according to this disclosure. In particular, FIG. 14A illustrates an example ED 1310, and FIG. 14B illustrates an example base station 1370. These components could be used in the communication system 1300 or in any other suitable system.

As shown in FIG. 14A, the ED 1310 includes at least one processing unit 1400. The processing unit 1400 implements various processing operations of the ED 1310. For example, the processing unit 1400 could perform signal coding, data processing, power control, input/output processing, or any other functionality enabling the ED 1310 to operate in the communication system 1300. The processing unit 1400 may also be configured to implement some or all of the functionality and/or embodiments described in more detail herein. Each processing unit 1400 includes any suitable processing or computing device configured to perform one or more operations. Each processing unit 1400 could, for example, include a microprocessor, microcontroller, digital signal processor, field programmable gate array, or application specific integrated circuit.

The ED 1310 also includes at least one transceiver 1402. The transceiver 1402 is configured to modulate data or other content for transmission by at least one antenna or Network Interface Controller (NIC) 1404. The transceiver 1402 is also configured to demodulate data or other content received by the at least one antenna 1404. Each transceiver 1402 includes any suitable structure for generating signals for wireless or wired transmission and/or processing signals received wirelessly or by wire. Each antenna 1404 includes any suitable structure for transmitting and/or receiving wireless or wired signals. One or multiple transceivers 1402 could be used in the ED 1310. One or multiple antennas 1404 could be used in the ED 1310. Although shown as a single functional unit, a transceiver 1402 could also be implemented using at least one transmitter and at least one separate receiver.

The ED 1310 further includes one or more input/output devices 1406 or interfaces (such as a wired interface to the internet 1350 in FIG. 13). The input/output devices 1406 permit interaction with a user or other devices in the network. Each input/output device 1406 includes any suitable structure for providing information to or receiving information from a user, such as a speaker, microphone, keypad, keyboard, display, or touch screen, including network interface communications.

In addition, the ED 1310 includes at least one memory 1408. The memory 1408 stores instructions and data used, generated, or collected by the ED 1310. For example, the memory 1408 could store software instructions or modules configured to implement some or all of the functionality and/or embodiments described herein and that are executed by the processing unit(s) 1400. Each memory 1408 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 14B, the base station 1370 includes at least one processing unit 1450, at least one transmitter 1452, at least one receiver 1454, one or more antennas 1456, at least one memory 1458, and one or more input/output devices or interfaces 1466. A transceiver, not shown, may be used instead of the transmitter 1452 and receiver 1454. A scheduler 1453 may be coupled to the processing unit 1450. The scheduler 1453 may be included within or operated separately from the base station 1370. The processing unit 1450 implements various processing operations of the base station 1370, such as signal coding, data processing, power control, input/output processing, or any other functionality. The processing unit 1450 can also be configured to implement some or all of the functionality and/or embodiments described in more detail herein. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transmitter 1452 includes any suitable structure for generating signals for wireless or wired transmission to one or more EDs or other devices. Each receiver 1454 includes any suitable structure for processing signals received wirelessly or by wire from one or more EDs or other devices. Although shown as separate components, at least one transmitter 1452 and at least one receiver 1454 could be combined into a transceiver. Each antenna 1456 includes any suitable structure for transmitting and/or receiving wireless or wired signals. Although a common antenna 1456 is shown here as being coupled to both the transmitter 1452 and the receiver 1454, one or more antennas 1456 could be coupled to the transmitter(s) 1452, and one or more separate antennas 1456 could be coupled to the receiver(s) 1454. Each memory 1458 includes any suitable volatile and/or non-volatile storage and retrieval device(s) such as those described above in connection to the ED 1310 in FIG. 14A. The memory 1458 stores instructions and data used, generated, or collected by the base station 1370. For example, the memory 1458 could store software instructions or modules configured to implement some or all of the functionality and/or embodiments described herein and that are executed by the processing unit(s) 1450.

Each input/output device 1466 permits interaction with a user or other devices in the network. Each input/output device 1466 includes any suitable structure for providing information to or receiving/providing information from a user, including network interface communications.

Figure 15:
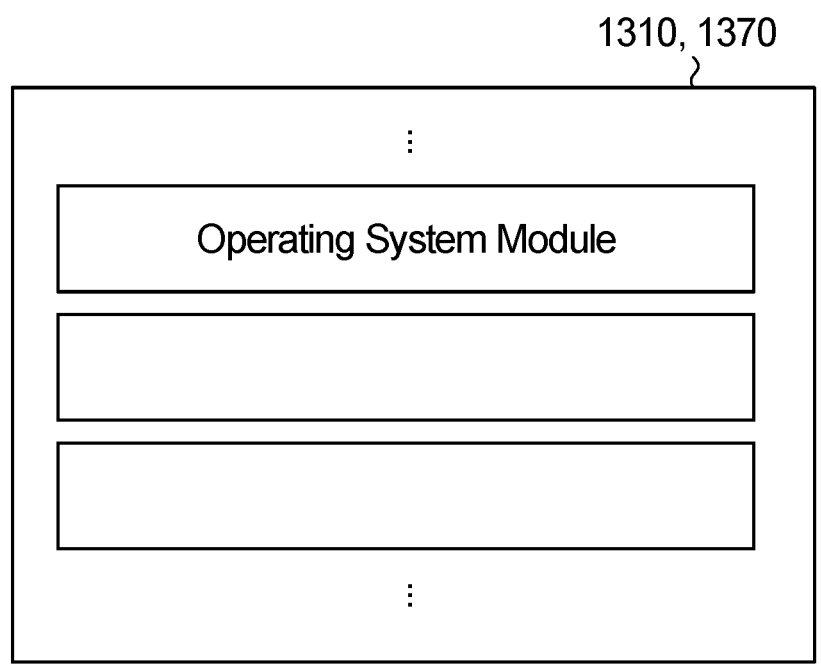
FIG. 15 is a block diagram of component modules.

It should be appreciated that one or more steps of the embodiment methods provided herein may be performed by corresponding units or modules, according to FIG. 15. For example, a signal may be transmitted by a transmitting unit or a transmitting module. A signal may be received by a receiving unit or a receiving module. A signal may be processed by a processing unit or a processing module. Other steps may be performed by an ML module. The respective units/modules may be implemented using hardware, one or more components or devices that execute software, or a combination thereof. For instance, one or more of the units/modules may be an integrated circuit, such as field programmable gate arrays (FPGAs) or application-specific integrated circuits (ASICs). It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs such as 1310 and base stations such as 1370 are known to those of skill in the art. As such, these details are omitted here.

In general, apparatus embodiments implementing methods as disclosed herein could take any of various forms. For example, in an embodiment, network equipment for a wireless communication network includes a plurality of antennas associated with multiple antenna ports, a processor coupled to the plurality of antennas, and a processor-readable memory coupled to the processor. The base station 1370 is an example of such network equipment, with a plurality of antennas at 1456, a processor in the form of a processing unit 1450, and a processor-readable memory 1458 coupled to the processing unit.

The processor-readable memory stores processor-executable instructions which, when executed by the processor, cause the processor to perform a method as disclosed herein. In an embodiment, the instructions cause the processor to perform a method that involves communicating, with a UE, sparse reference signal-related signaling for a wireless channel that is associated with the multiple antenna ports. The sparse reference signal-related signaling is consistent with a sparse signaling pattern, which in some embodiments includes reference signal-related signaling associated with each of the antenna ports, and has been determined based on previous reference signal-related signaling previously communicated with the UE or another UE.

Features that are described elsewhere herein are also applicable to network equipment embodiments. For example, embodiments may include any one or more of the following features, in any of various combinations:
  the processor-executable instructions, when executed by the processor, further cause the processor to receive the previous reference signal-related signaling;
  the processor-executable instructions, when executed by the processor, further cause the processor to determine the sparse signaling pattern based on the previous reference signal-related signaling;

the processor-executable instructions, when executed by the processor, further cause the processor to determine the sparse signaling pattern based on the previous reference signal-related signaling by: determining, based on the previous reference signal-related signaling, correlations between the antenna ports; and determining the sparse signaling pattern based on the correlations;

the processor-executable instructions, when executed by the processor, further cause the processor to receive the previous reference signal-related signaling for offline operation that is separate from reference signal-related signaling for communications with the UE or the other UE;

the processor-executable instructions, when executed by the processor, further cause the processor to receive the previous reference signal-related signaling for online operation that is associated with communications with the UE or the other UE;

the reference signal-related signaling is or includes a CSI-RS associated with each of the antenna ports and UE feedback corresponding to each CSI-RS;

the communicating involves transmitting to the UE the CSI-RS associated with each of the antenna ports and receiving from the UE the feedback corresponding to each CSI-RS;

the reference signal-related signaling is or includes a DM-RS associated with each of the antenna ports;

the communicating involves transmitting to the UE the DM-RS associated with each of the antenna ports;

the communicating involves transmitting the sparse reference signal-related signaling to the UE;

the processor-executable instructions, when executed by the processor, further cause the processor to: transmit to the UE one or more parameters for prediction of the wireless channel based on the sparse reference signal-related signaling;

According to another embodiment, instructions stored in a processor-readable memory at network equipment cause a network equipment processor to communicate with a UE sparse reference signal-related signaling that is consistent with a varying sparse signaling pattern based on previous reference signal-related signaling previously communicated with the UE or another UE. Such an embodiment may include other features as well.

For example, embodiments may include any one or more of the following features, in any of various combinations:

the processor-executable instructions, when executed by the processor, further cause the processor to receive the previous reference signal-related signaling;

the processor-executable instructions, when executed by the processor, further cause the processor to determine the varying sparse signaling pattern based on the previous reference signal-related signaling;

the varying sparse signaling pattern includes multiple sparse signaling patterns;

the multiple patterns are associated with respective channel predictors;

the multiple patterns are associated with one channel predictor for the overall varying pattern;

the processor-executable instructions, when executed by the processor, further cause the processor to switch between different sparse signaling patterns;

the processor-executable instructions, when executed by the processor, further cause the processor to determine, based on a current sparse signaling pattern, a channel predictor to be used for that pattern;

the communicating involves communicating the sparse reference signal-related signaling by communicating the sparse reference signal-related signaling with the UE in multiple RBs;

the processor-executable instructions, when executed by the processor, cause the processor to switch between the different sparse signaling patterns for different RBs of the multiple RBs;

the communicating involves communicating the sparse reference signal-related signaling with the UE in multiple time slots;

the processor-executable instructions, when executed by the processor, cause the processor to switch between the different sparse signaling patterns for different time slots of the multiple time slots;

the communicating involves communicating the sparse signaling with the UE in multiple RBs and multiple time slots;

the processor-executable instructions, when executed by the processor, cause the processor to switch between the different sparse signaling patterns for different RBs of the multiple RBs and for different time slots of the multiple time slots;

the reference signal-related signaling is or includes CSI-RSs associated with the antenna ports and UE feedback corresponding to each of the CSI-RSs;

the communicating involves transmitting the CSI-RSs to the UE and receiving from the UE the feedback corresponding to each of the CSI-RSs;

the reference signal-related signaling is or includes DM-RSs associated with the antenna ports;

the communicating involves transmitting the DM-RSs to the UE.

the communicating involves transmitting the sparse reference signal-related signaling to the UE;

the processor-executable instructions, when executed by the processor, further cause the processor to transmit to the UE one or more parameters for prediction of the wireless channel based on the sparse reference signal-related signaling;

the sparse reference signal-related signaling includes reference signal-related signaling associated with each of the antenna ports.

Other network equipment embodiments are also possible.

For example, the description above focuses primarily on network equipment. A wireless communication network will likely include multiple installations of network equipment. In an embodiment, a wireless communication network includes multiple base stations, with at least some of those base stations being implemented as, or at least including, network equipment as disclosed herein. For example, each installation of network equipment may be provided for training one or more respective ML modules for each base station, and for supporting ML-assisted signaling reduction for communications between each base station and UEs at locations within the network.

Method and apparatus embodiments described herein encompass both training and operations. Considering operations separately from training, in some embodiments a network equipment method or operation involves receiving from a UE an indication of a current location of the UE in the wireless communication network, and using the current location of the UE as an input to obtain a sparse signaling pattern as disclosed herein.

Method embodiments and network equipment embodiments represent illustrative example implementations of features disclosed herein. Such features could also or instead be implemented in the form of processor-executable instructions stored in a processor-readable memory. These processor-executable instructions, when executed by a processor in network equipment in a wireless communication network, cause the processor to perform a method.

In some embodiments, the method includes communicating, with a UE, sparse reference signal-related signaling for a wireless channel that is associated with the multiple antenna ports. The sparse reference signal-related signaling is consistent with a sparse signaling pattern. The sparse signaling pattern includes reference signal-related signaling associated with each of the antenna ports, and was determined based on previous reference signal-related signaling previously communicated with the UE or another UE.

According to another embodiment, the method includes communicating, with a UE, sparse reference signal-related signaling for a wireless channel that is associated with multiple antenna ports, with the sparse reference signal-related signaling being consistent with a varying sparse signaling pattern that is based on previous reference signal-related signaling previously communicated with the UE or another UE.

Features that are disclosed elsewhere herein are also applicable to methods that are implemented in the form of processor-executable instructions stored in processor-readable memory.

Some features disclosed herein are applicable to UEs. For example, at a UE side, sparse signaling is received and used for channel estimation and/or acquisition. In a CSI-RS embodiment, channel estimates are fed back to network equipment. In a DM-RS embodiment, a UE uses one or more parameters received from network equipment to demodulate received signals based on sparse DM-RS signaling.

Other UE embodiments are also possible.

In one embodiment, a method performed by a UE in a wireless communication network involves communicating, with network equipment in the wireless communication network, sparse reference signal-related signaling for a wireless channel that is associated with multiple antenna ports of the network equipment. As also disclosed elsewhere herein, the sparse reference signal-related signaling may be consistent with a sparse signaling pattern that includes reference signal-related signaling associated with each of the antenna ports, and the sparse signaling pattern has been determined based on previous reference signal-related signaling previously communicated with the UE or another UE.

Other features disclosed herein may be implemented in UE embodiments. For example, UE embodiments may include any one or more of the following features, in any of various combinations:
- the sparse signaling pattern is determined based on correlations between the antenna ports;
- the correlations are determined based on the previous reference signal-related signaling;
- the previous reference signal-related signaling was received for offline operation that is separate from reference signal-related signaling for communications with the UE or the other UE;
- the previous reference signal-related signaling was received for online operation that is associated with communications with the UE or the other UE;
- the reference signal-related signaling is or includes a CSI-RS associated with each of the antenna ports and UE feedback corresponding to each CSI-RS;
- the communicating includes receiving from the network equipment the CSI-RS associated with each of the antenna ports;
- the communicating includes transmitting to the network equipment the feedback corresponding to each CSI-RS;
- the reference signal-related signaling is or includes a DM-RS associated with each of the antenna ports;
- the communicating involves receiving from the network equipment the DM-RS associated with each of the antenna ports;
- the communicating involves receiving the sparse reference signal-related signaling from the network equipment;
- a method also involves receiving from the network equipment one or more parameters for prediction of the wireless channel based on the sparse reference signal-related signaling.

A UE for a wireless communication network may implement such methods. For example, in an embodiment a UE includes an antenna, a processor coupled to the antenna; and a processor-readable memory, coupled to the processor, and storing processor-executable instructions which, when executed by the processor, cause the processor to perform a method that involves communicating, with network equipment in the wireless communication network, sparse reference signal-related signaling for a wireless channel that is associated with multiple antenna ports of the network equipment. The sparse reference signal-related signaling is consistent with a sparse signaling pattern that includes reference signal-related signaling associated with each of the antenna ports in some embodiments, and the sparse signaling pattern was determined based on previous reference signal-related signaling previously communicated with the UE or another UE.

Any one or more of the following features may be provided in such a UE, in any of various combinations:
- the sparse signaling pattern is determined based on correlations between the antenna ports;
- the correlations are determined based on the previous reference signal-related signaling;
- the previous reference signal-related signaling was received for offline operation that is separate from reference signal-related signaling for communications with the UE or the other UE;
- the previous reference signal-related signaling was received for online operation that is associated with communications with the UE or the other UE;
- the reference signal-related signaling is or includes a CSI-RS associated with each of the antenna ports and UE feedback corresponding to each CSI-RS;
- the communicating involves receiving from the network equipment the CSI-RS associated with each of the antenna ports;
- the communicating involves transmitting to the network equipment the feedback corresponding to each CSI-RS;
- the reference signal-related signaling is or includes a DM-RS associated with each of the antenna ports;
- the communicating involves receiving from the network equipment the DM-RS associated with each of the antenna ports;
- the communicating involves receiving the sparse reference signal-related signaling from the network equipment;
- the processor-executable instructions, when executed by the processor, further cause the processor to: receive from the network equipment one or more parameters for prediction of the wireless channel based on the sparse reference signal-related signaling.

In another UE-related embodiment, a processor-readable memory stores processor-executable instructions which, when executed by a processor in a UE in a wireless communication network, cause the processor to perform a method. The method involves communicating, with network equipment in the wireless communication network, sparse reference signal-related signaling for a wireless channel that is associated with the multiple antenna ports of the network equipment. The sparse reference signal-related signaling is consistent with a sparse signaling pattern that includes reference signal-related signaling associated with each of the antenna ports, and that was determined based on previous reference signal-related signaling previously communicated with the UE or another UE. Other features disclosed herein may also or instead be provided in processor-readable memory embodiments.

Another method performed by a UE in a wireless communication network involves communicating, with network equipment in the wireless communication network, sparse reference signal-related signaling for a wireless channel that is associated with multiple antenna ports of the network equipment, but with the sparse reference signal-related signaling being consistent with a varying sparse signaling pattern that is based on previous reference signal-related signaling previously communicated with the UE or another UE.

Any one or more of the following features may be provided, in any of various combinations:
- the varying sparse signaling pattern includes multiple sparse signaling patterns;
- a method also involves switching between different sparse signaling patterns of the multiple sparse signaling patterns;
- the communicating involves communicating the sparse reference signal-related signaling with the network equipment in multiple RBs;
- the switching involves switching between the different sparse signaling patterns for different RBs of the multiple RBs;
- the communicating involves communicating the sparse reference signal-related signaling with the network equipment in multiple time slots;
- the switching involves switching between the different sparse signaling patterns for different time slots of the multiple time slots;
- the communicating involves communicating the sparse reference signal-related signaling with the network equipment in multiple RBs and multiple time slots;
- the switching involves switching between the different sparse signaling patterns for different RBs of the multiple RBs and for different time slots of the multiple time slots;
- the reference signal-related signaling is or includes CSI-RSs associated with the antenna ports and UE feedback corresponding to each of the CSI-RSs;
- the communicating involves receiving the CSI-RSs from the network equipment;
- the communicating involves transmitting to the network equipment the feedback corresponding to each of the CSI-RSs;
- the reference signal-related signaling is or includes DM-RSs associated with the antenna ports;
- communicating involves receiving the DM-RSs from the network equipment;
- the communicating involves receiving the sparse reference signal-related signaling from the network equipment;
- a method also involves receiving from the network equipment one or more parameters for prediction of the wireless channel based on the sparse reference signal-related signaling;
- the sparse reference signal-related signaling includes reference signal-related signaling associated with each of the antenna ports.

In a UE that includes an antenna, a processor coupled to the antenna, and a processor-readable memory coupled to the processor, the memory may store processor-executable instructions which, when executed by the processor, cause the processor to perform a method that involves communicating, with network equipment in the wireless communication network, sparse reference signal-related signaling for a wireless channel that is associated with multiple antenna ports of the network equipment. The sparse reference signal-related signaling is consistent with a varying sparse signaling pattern that is based on previous reference signal-related signaling previously communicated with the UE or another UE in some embodiments.

Any one or more of the following features, in any of various combinations, may be provided by a UE:
- the varying sparse signaling pattern includes multiple sparse signaling patterns;
- the processor-executable instructions, when executed by the processor, further cause the processor to switch between different sparse signaling patterns of the multiple sparse signaling patterns;
- the communicating involves communicating the sparse reference signal-related signaling by communicating the sparse reference signal-related signaling with the UE in multiple RBs;
- the processor-executable instructions, when executed by the processor, cause the processor to switch between the different sparse signaling patterns for different RBs of the multiple RBs;
- the communicating involves communicating the sparse reference signal-related signaling with the UE in multiple time slots;
- the processor-executable instructions, when executed by the processor, cause the processor to switch between the different sparse signaling patterns for different time slots of the multiple time slots;
- the communicating involves communicating the sparse reference signal-related signaling with the UE in multiple RBs and multiple time slots;
- the processor-executable instructions, when executed by the processor, cause the processor to switch between the different sparse signaling patterns for different RBs of the multiple RBs and for different time slots of the multiple time slots;
- the reference signal-related signaling is or includes CSI-RSs associated with the antenna ports and UE feedback corresponding to each of the CSI-RSs;
- the communicating involves receiving the CSI-RSs from the network equipment;
- the communicating involves transmitting to the network equipment the feedback corresponding to each of the CSI-RSs;
- the reference signal-related signaling is or includes DM-RSs associated with the antenna ports;
- the communicating involves receiving the DM-RSs from the network equipment;
- the communicating involves receiving the sparse reference signal-related signaling from the network equipment;

the processor-executable instructions, when executed by the processor, further cause the processor to receive from the UE one or more parameters for prediction of the wireless channel based on the sparse reference signal-related signaling;

the sparse reference signal-related signaling includes reference signal-related signaling associated with each of the antenna ports.

According to another UE-related embodiment, a processor-readable memory stores processor-executable instructions which, when executed by a processor in a UE in a wireless communication network, cause the processor to perform a method that involves communicating, with network equipment in the wireless communication network, sparse reference signal-related signaling for a wireless channel that is associated with multiple antenna ports of the network equipment. As in some other embodiments disclosed herein, the sparse reference signal-related signaling is consistent with a varying sparse signaling pattern that is based on previous reference signal-related signaling previously communicated with the UE or another UE. Other features disclosed herein may be provided in processor-readable memory embodiments.

In general, embodiments disclosed herein support new, potentially lower density signaling configurations, for CSI-RS and DM-RS for example. Some embodiments introduce hopping between signaling patterns, such as in alternating time slots and/or RBs.

Per antenna port signaling configuration is possible.

In some embodiments, downlink channel dependencies are learned, across CSI-RS APs using CSI-RS feedback from one or more UEs, for example. Downlink channel dependencies of DM-RS APs are learned in other embodiments, using SRS signaling transmitted by one or more UEs.

Other variations are also contemplated. For example, regarding reference signals or pilots such as CSI-RS and DM-SRS, such signals may be beamformed, using analog beamforming and/or digital beamforming. Antenna ports may therefore be physical antenna ports, or virtual antenna ports that are in effect generated after beamforming.

Virtual antenna ports may also or instead correspond to MIMO layers. Accordingly, antenna ports are not limited only to antenna ports as disclosed earlier herein, and may include virtual antenna ports that correspond to MIMO layers and/or to beams. The number of virtual antenna ports can be less than the number of physical antenna ports.

It should therefore be appreciated that the teachings herein may be applied to embodiments that support such features as beamforming and/or virtual antenna ports. For example, sparse pilot pattern density may be defined, specified, or considered in terms of pilot or signaling density per (virtual) antenna port, per MIMO layer, and/or per beam.

Numerous modifications and variations of the present disclosure are possible in light of the above teachings. It is therefore to be understood that within the scope of the appended claims, the disclosure may be practiced otherwise than as specifically described herein.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

Although this disclosure refers to illustrative embodiments, the disclosure is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as processor-executable or computer-executable instructions stored on a non-transitory processor-readable or computer-readable medium, for example. Such media could store programming or instructions to perform any of various methods consistent with the present disclosure.

Moreover, any module, component, or device exemplified herein that executes instructions may include or otherwise have access to a non-transitory computer-/processor-readable storage medium or media for storage of information, such as computer-/processor-readable instructions, data structures, program modules, and/or other data. A non-exhaustive list of examples of non-transitory computer-/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer-/processor-readable storage media may be part of a device or accessible or connectable thereto. Any application or module herein described may be implemented using computer-/processor-readable/executable instructions that may be stored or otherwise held by such non-transitory computer-/processor-readable storage media.

The invention claimed is:

1. A method performed by network equipment in a wireless communication network, the method comprising:
communicating, with a first User Equipment (UE), a first reference signal for a wireless channel that is associated with a plurality of antenna ports,
obtaining a configuration of a second reference signal to a second UE, wherein the second UE is same as or different than the first UE,
communicating, by the network equipment, the second reference signal with the second UE, wherein the second reference signal is consistent with a sparse signal pattern and has a lower density of reference signal than the first reference signal.

2. The method of claim 1,
wherein the first reference signal comprises a dense Channel State Information Reference Signal (CSI-RS) transmitted by the network equipment and the second reference signal comprises a sparse CSI-RS transmitted by the network equipment,
or
wherein the first reference signal comprises a dense Sounding Reference Signal (SRS) received from the first UE and the second reference signal comprises a sparse Demodulation Reference Signal (DM-RS) transmitted by the network equipment.

3. The method of claim 1, wherein the obtaining a configuration of a second reference signal to a second UE comprises:
obtaining a configuration of a second reference signal based on:
a first Channel State Information (CSI) feedback received from the first UE based on the first reference signal,
or
a second CSI measured by the network equipment based on the first reference signal, wherein the first reference signal is received from the first UE.

4. The method of claim 3, further comprising:
learning channel dependencies of the wireless channel based on the first CSI or the second CSI.

5. The method of claim 1, wherein the communicating the second reference signal comprises transmitting the second reference signal to the second UE, and wherein the method further comprises:
receiving CSI feedback from the second UE based on the second reference signal;
reconstructing the wireless channel based on the CSI feedback.

6. The method of claim 4, wherein the communicating the second reference signal comprises transmitting the second reference signal to the second UE, and wherein the method further comprises:
receiving a third CSI feedback from the second UE based on the second reference signal;
reconstructing the wireless channel based on the third CSI feedback and the learned channel dependencies of the wireless channel.

7. The method of claim 1, further comprising:
transmitting, to the second UE, one or more parameters for reconstructing of the wireless channel based on the second reference signal.

8. The method of claim 1, wherein the second reference signal has a lower density of reference signal than the first reference signal comprises:
the second reference signal is associated with a subset of the plurality of antenna ports,
and/or
the density of reference signal on part or all antenna ports in the subset of the plurality of antenna ports is lower than the first reference signal in at least one of time domain and frequency domain.

9. The method of claim 1,
wherein the first reference signal is for offline operation and is separate from a reference signal for communications with the UE,
or
wherein the first reference signal is for online operation and is associated with communications with the UE.

10. Network equipment for a wireless communication network, the network equipment comprising:
a plurality of antennas associated with multiple antenna ports;
a processor coupled to the plurality of antennas; and
a processor-readable memory, coupled to the processor, and storing processor-executable instructions which, when executed by the processor, cause the network equipment to perform a method comprising:
communicating, with a first User Equipment (UE), a first reference signal for a wireless channel that is associated with a plurality of antenna ports,
obtaining a configuration of a second reference signal to a second UE, wherein the second UE is same as or different than the first UE,
communicating the second reference signal with the second UE, wherein the second reference signal is consistent with a sparse signal pattern and has a lower density of reference signal than the first reference signal.

11. The network equipment of claim 10,
wherein the first reference signal comprises a dense Channel State Information Reference Signal (CSI-RS) transmitted by the network equipment and the second reference signal comprises a sparse CSI-RS transmitted by the network equipment,
or
wherein the first reference signal comprises a dense Sounding Reference Signal (SRS) received from the first UE and the second reference signal comprises a second Demodulation Reference Signal (DM-RS) transmitted by the network equipment.

12. The network equipment of claim 10, wherein the obtaining a configuration of a second reference signal to a second UE comprises:
obtaining a configuration of a second reference signal based on:
a first Channel State Information (CSI) feedback received from the first UE based on the first reference signal,
or
a second CSI measured by the network equipment based on the first reference signal, wherein the first reference signal is received from the first UE.

13. The network equipment of claim 12, wherein the processor-executable instructions, when executed by the processor, further cause the network equipment to:
learn channel dependencies of the wireless channel based on the first CSI or the second CSI.

14. The network equipment of claim 10, wherein the communicating the second reference signal comprises transmitting the second reference signal to the second UE, and wherein the processor-executable instructions, when executed by the processor, further cause the network equipment to:
- receive CSI feedback from the second UE based on the second reference signal;
- reconstruct the wireless channel based on the CSI feedback.

15. The network equipment of claim 13, wherein the communicating the second reference signal comprises transmitting the second reference signal to the second UE, and wherein the processor-executable instructions, when executed by the processor, further cause the network equipment to:
- receive a third CSI feedback from the second UE based on the second reference signal;
- reconstruct the wireless channel based on the third CSI feedback and the learned channel dependencies of the wireless channel.

16. The network equipment of claim 10, wherein the processor-executable instructions, when executed by the processor, further cause the network equipment to:
- transmit, to the second UE, one or more parameters for reconstructing of the wireless channel based on the second reference signal.

17. The network equipment of claim 10, wherein the second reference signal has a lower density of reference signal than the first reference signal comprises:
- the second reference signal is associated with a subset of the plurality of antenna ports, and/or
- the density of reference signal on part or all antenna ports in the subset of the plurality of antenna ports is lower than the first reference signal in at least one of time domain and frequency domain.

18. The network equipment of claim 10,
- wherein the first reference signal is for offline operation and is separate from a reference signal for communications with the UE, or
- wherein the first reference signal is for online operation and is associated with communications with the UE.

19. A method performed by a User Equipment (UE) in a wireless communication network, the method comprising:
- communicating, with network equipment in the wireless communication network, a first reference signal for a wireless channel that is associated with a plurality of antenna ports,
- obtaining a configuration of a second reference signal,
- communicating the second reference signal with the network equipment, wherein the second reference signal is consistent with a sparse signal pattern and has a lower density of reference signal than the first reference signal.

20. The method of claim 19,
- wherein the first reference signal comprises a dense Channel State Information Reference Signal (CSI-RS) received by the UE from the network equipment and the second reference signal comprises a sparse CSI-RS received by the UE from the network equipment, or
- wherein the first reference signal comprises a dense Sounding Reference Signal (SRS) transmitted by the UE to the network equipment and the second reference signal comprises a sparse Demodulation Reference Signal (DM-RS) received by the UE from the network equipment.

21. The method of claim 19, wherein the obtaining a configuration of a second reference signal comprises:
- obtaining a configuration of a second reference signal based on:
  - a first Channel State Information (CSI) feedback measured by the UE based on the first reference signal, or
- receiving the configuration of a second reference signal from the network equipment.

22. The method of claim 19, wherein the communicating the second reference signal comprises receiving the second reference signal from the network equipment, and wherein the method further comprises:
- transmitting CSI feedback to the network equipment based on the second reference signal.

23. The method of claim 19, further comprising:
- receiving, by the UE from the network equipment, one or more parameters for reconstructing of the wireless channel based on the second reference signal;
- reconstructing the wireless channel of the plurality of antenna ports based on the one or more parameters and the second reference signal.

24. The method of claim 19, wherein the second reference signal has a lower density of reference signal than the first reference signal comprises:
- the second reference signal is associated with a subset of the plurality of antenna ports, and/or
- the density of reference signal on part or all antenna ports in the subset of the plurality of antenna ports is lower than the first reference signal in at least one of time domain and frequency domain.

25. The method of claim 19,
- wherein the first reference signal is for offline operation and is separate from a reference signal for communications with the network equipment, or
- wherein the first reference signal is for online operation and is associated with communications with the network equipment.

26. A User Equipment (UE) for a wireless communication network, the UE comprising:
- an antenna;
- a processor coupled to the antenna; and
- a processor-readable memory, coupled to the processor, and storing processor-executable instructions which, when executed by the processor, cause the UE to perform a method comprising:
  - communicating, with network equipment in the wireless communication network, a first reference signal for a wireless channel that is associated with a plurality of antenna ports,
  - obtaining a configuration of a second reference signal,
  - communicating the second reference signal with the network equipment, wherein the second reference signal is consistent with a sparse signal pattern and has a lower density of reference signal than the first reference signal.

27. The UE of claim 26,
- wherein the first reference signal comprises a dense Channel State Information Reference Signal (CSI-RS) received by the UE from the network equipment and the second reference signal comprises a sparse CSI-RS received by the UE from the network equipment, or
- wherein the first reference signal comprises a dense Sounding Reference Signal (SRS) transmitted by the UE to the network equipment and the second reference signal comprises a sparse Demodulation Reference Signal (DM-RS) received by the UE from the network equipment.

28. The UE of claim 26, wherein the obtaining a configuration of a second reference signal comprises:
   obtaining a configuration of a second reference signal based on:
   a first Channel State Information (CSI) feedback measured by the UE based on the first reference signal,
or
   receiving the configuration of a second reference signal from the network equipment.

29. The UE of claim 26, wherein the communicating the second reference signal comprises receiving the second reference signal from the network equipment, and wherein the processor-executable instructions, when executed by the processor, further cause the UE to:
   transmit CSI feedback to the network equipment based on the second reference signal.

30. The UE of claim 26, wherein the processor-executable instructions, when executed by the processor, further cause the UE to:
   receive, from the network equipment, one or more parameters for reconstructing of the wireless channel based on the second reference signal;
   reconstruct the wireless channel of the plurality of antenna ports based on the one or more parameters and the second reference signal.

31. The UE of claim 26, wherein the second reference signal has a lower density of reference signal than the first reference signal comprises:
   the second reference signal is associated with a subset of the plurality of antenna ports,
and/or
   the density of reference signal on part or all antenna ports in the subset of the plurality of antenna ports is lower than the first reference signal in at least one of time domain and frequency domain.

32. The UE of claim 26,
   wherein the first reference signal is for offline operation and is separate from a reference signal for communications with the network equipment,
or
   wherein the first reference signal is for online operation and is associated with communications with the network equipment.

* * * * *